United States Patent [19]

Polge et al.

[11] Patent Number: 5,469,167
[45] Date of Patent: Nov. 21, 1995

[54] SYNTHETIC APERTURE RADAR FOR NONLINEAR TRAJECTORIES USING RANGE RELATIVE DOPPLER PROCESSING AND INVARIANT MAPPING

[75] Inventors: Robert J. Polge, Baton Rouge, La.; Augustus H. Green, Jr., Huntsville, Ala.

[73] Assignee: The United States of America as represented by the Secretary of the Army, Washington, D.C.

[21] Appl. No.: 432,353

[22] Filed: May 1, 1995

Related U.S. Application Data

[63] Continuation of Ser. No. 137,455, Oct. 18, 1993, abandoned.

[51] Int. Cl.[6] .............................. G01S 13/90; G01S 7/483
[52] U.S. Cl. .............................. 342/25; 342/194; 342/201
[58] Field of Search .............................. 342/25, 194, 201, 342/202

[56] References Cited

U.S. PATENT DOCUMENTS

| | | | |
|---|---|---|---|
| 4,321,601 | 3/1982 | Richman | 342/25 |
| 4,616,227 | 10/1986 | Homma et al. | 342/25 |
| 4,847,624 | 7/1989 | Hopwood et al. | 342/25 X |
| 4,908,625 | 3/1990 | Anthouard et al. | 342/25 |
| 5,250,952 | 10/1993 | Roth | 342/25 |
| 5,327,140 | 7/1994 | Buckreuss | 342/25 |
| 5,381,152 | 1/1995 | Klausing | 342/25 |

OTHER PUBLICATIONS

A. Polge, R. J.; Bassim, R. M.; Jong, G. K.; vol. I of "Extension and Updating of the Computer Simulation of Range Relative Doppler Processing for MM Wave seekers", Technical Report CR–RD–AS–90–3, published Oct. 1990, U.S. Army Missile Command, Redstone Arsenal, Ala.

B. Polge, R. J.; Bassim, R. M.; Jong, G. K.; vol II of Reference A (hereinabove)titled "User Manual of the Range Relative Doppler Processing for MM Wave Seekers", Technical Report CR–RD–AS–90–3, published Oct. 1990, U.S. Army Missile Command, Redstone Arsenal, Ala.

C. Polge, R. J.; Bassem, R. M.; and Jong, G. K.; vol. III of Reference A (hereinabove) titled "Simulation of a Doppler Beam Sharpening Radar for MM Wave Seekers", Technical Report CR–RD–AS–90–3, published Oct. 1990, U.S. Army Missile Command, Redstone Arsenal, Ala.

*Primary Examiner*—Gilberto Barrón, Jr.
*Attorney, Agent, or Firm*—Hugh P. Nicholson; Freddie M. Bush

[57] ABSTRACT

Synthetic aperture radar imaging for nonlinear trajectories utilizing range relative doppler processing, invariant mapping of information from arbitrary shaped cells onto an X—Y coordinate system, and round trip signal delay which allows accurate synthesis of a reference signal for each range cell. A synthetic signal synthesizer produces the reference signal for synchronous demodulation in the radar.

12 Claims, 11 Drawing Sheets

$m_g$ - at central time vertical projection of antenna position

SYNTHETIC APERTURE RADAR FOR NONLINEAR TRAJECTORIES USING RANGE RELATIVE DOPPLER PROCESSING AND INVARIANT MAPPING

DEDICATORY CLAUSE

The invention described herein may be manufactured, used, and licensed by or for the Government for governmental purposes without the payment to us of any royalties thereon. This application is a continuation of application Ser. No. 08/137,455, filed Oct. 18, 1993, now abandoned.

BACKGROUND OF THE INVENTION

A pulse doppler radar partitions each range cell within its footprint into doppler cells. Synthetic aperture radar imaging includes two major steps: processing each footprint, as in the pulse doppler radar to obtain a map of reflectivity versus range and doppler, and transferring and accumulating the reflectivity information of each footprint onto an absolute x—y reflectivity map, one doppler cell after the other. This second step is denoted as mapping. In the classical synthetic aperture radar (SAR) the antenna illuminates a sideway footprint while following a horizontal linear trajectory at constant velocity. Since the footprint is moving, each scatterer appears to move with respect to the range cell boundaries. This phenomenon which is called range walk is critical, because a pulse doppler radar requires that the scatterers remain within the same range cell during the entire observation interval ($D_{ob}$). For the linear geometry of the classical SAR, the range walk effect is small. Therefore, the SAR can operate with a sufficiently large observation interval to achieve a high doppler resolution, and consequently a high azimuth resolution. The mapping of a trapezoidal azimuth cell, corresponding to a doppler cell, onto the absolute x—y reflectivity map is easily performed on the basis of geometric considerations, because all the footprints are the same except for a translation.

However, for a nonlinear geometry, range walk increases and the range walk constraint reduces the observation interval to such an extent that classical SAR is not practical. To extend SAR imaging to nonlinear geometries range walk must be reduced to extend the applicability of pulse doppler radars, and a mapping method must be used which works even when the size, shape, and orientation of the azimuth cells varies. By using range relative doppler processing and invariant mapping these problems can be resolved.

Standard pulse radars divide the beam into $N_R$ range cells. Pulse doppler radars transmit a sequence of $N_P$ pulses during the observation interval. For each transmitted pulse, $N_R$ pairs of in phase and quadrature samples are collected, one pair for each range cell. At the end of the observation interval, the raw data is stored in an information matrix of size $N_P \times N_R$. Each scatterer generates $N_P$ return pulses during the observation interval. Assume that there are several scatterers within a range cell. Then, a Fourier analysis on the combined data for this range cell (one row of the information matrix) allows discrimination between the scatterers if their doppler difference is greater than the frequency resolution $\Delta f = 1/D_{ob}$. The main constraint for the pulse doppler radar is that the scatterers remain within the same range cell during the entire observation interval $D_{ob}$. In the case of nonlinear geometries, the range walk due to the relative motion between scatterers and targets increases as does the doppler bias. It follows that the observation interval has to be reduced to satisfy the range walk constraint and that the doppler increment $\Delta f$ increases to such an extent that the performance of the pulse doppler radar becomes unacceptable. The classical synthetic aperture radar also called sidelooking radar, is an advanced pulse doppler radar which includes mapping. The most common application is to generate a ground map of reflectivity versus absolute x—y coordinates through analysis of the data collected by an antenna which provides a sideway illumination while following a linear horizontal trajectory at constant velocity. At the center of the observation interval, the beam defines a footprint on the ground. A map of reflectivity versus range and doppler is generated for the footprint in the same manner as noted hereinabove for the pulse doppler radar. Then, the footprint information is transferred to and accumulated on an x—y reflectivity map, one trapezoidal azimuth cell at a time. This procedure, called mapping of all the footprints is completed, an estimated x—y reflectivity map is computed by averaging of the information from the overlapping footprints. In the classical SAR, mapping is based on geometric considerations because the size and shape of the azimuth cells remains the same.

SUMMARY OF THE INVENTION

Range Relative Doppler Processing (RRDP) reduces range walk by utilizing an electronic phase which compensates for range variation. Invariant Mapping (IM) allows arbitrary shaped range cells to be mapped. Modification of the classical SAR to include RRDP and IM extends the application of SAR to nonlinear geometries.

To implement RRDP and IM a very accurate representation of round trip delay of a transmitted signal is required. This is accomplished by using a multidimensional Taylor expansion which contains explicitly the azimuth, the elevation, and the height of the scatterers, as well as relative time. In the classical SAR, the round trip delay is expanded in the term of time only. The multidimensional Taylor expansion can be used to simulate or to synthesize accurately the return of an arbitrary scatterer. Other applications include focusing of phase array antennas.

In RRDP range walk is completely eliminated at the center of the range cell and much reduced even on the boundaries of the range cell. The center of the range cell corresponds to zero doppler, no matter how nonlinear is the trajectory. This means that doppler bias is also completely eliminated. The elimination of range walk at the center of each range cell is accomplished by performing a synchronous detection on the IF (intermediate frequency) return of each range cell using the quadrature components of a synthetic IF signal which corresponds to the doppler time history for a reference scatter at the center of the range cell being processed.

IM is used to transfer and to accumulate the reflectivity information of each trapezoidal azimuth cell onto an absolute x—y reflectivity map. This procedure is repeated until all the azimuth cells for all the range cells in all of the overlapping footprints are mapped. The estimated reflectivity for a rectangular cell in the x—y grid is the weighted average of the reflectivity density of all the trapezoidal cells which have some overlap with this rectangular cell. The weighting of the reflectivity density of the trapezoidal azimuth cell is equal to the area of overlap divided by the sum of all overlap areas for the particular rectangle. A very efficient algorithm is used to compute the areas of overlap between a trapezoid and a rectangular grid. Real time implementation is possible using special purpose hardware.

The synthetic aperture radar for nonlinear trajectories encompasses and is a combination of two key elements RRDP and IM. RRDP is based upon the concept of a reference scatter. Implementation of reference scattering allows greatly improved imaging capability to be achieved for nonlinear trajectories and/or variable velocities. The basis for implementation is the multidimensional Taylor expansion of round trip delay which has heretofore not been accomplished. IM transfers information from each azimuth cell onto an absolute reflectivity map. This allows combining (or integrating) information from a sequence of footprints. RRDP/IM is frequency independent and is applicable to ultrasound and laser radars, and to sonar systems. SAR mapping and imaging is made applicable where nonlinear geometries heretofore prevented the use of classical SAR imaging. The synthetic aperture radar for nonlinear trajectories allows a critical need to be met in the development of high resolution clutter and/or target models and the collection of high resolution clutter and/or target data. Robotic vision is another application with the potential for three dimensional imaging by combining phased array and synthetic aperture techniques. During operation, the radar antenna may be moving and the scatterers fixed; or the antenna can be fixed and the scatterers moving, or both the antenna and the scatterers may be moving. RRDP and IM also have useful applications outside of nonlinear SAR imaging. RRDP can improve the doppler performance of established radars. IM maps the information from an arbitrary grid to a rectangular grid. Thus it has applications outside of radars, whenever information displayed on arbitrary shaped maps needs to be merged onto an absolute x—y map, as in sensor fusion; and is also applicable in all systems using the electromagnetic spectrum.

Range relative doppler processing includes an electronic compensation for range walk and doppler bias. This compensation is exact at the center of each range cell, which appears as zero doppler no matter how nonlinear is the relative motion. Thus, RRDP extends the application of pulse doppler radars to nonlinear geometries, where the classical pulse doppler radars fail.

RRDP/IM was first developed to extend SAR imaging to nonlinear geometries with the primary goal to detect/discriminate ground targets. Classical SAR fails as set forth hereinabove because of excessive range walk and doppler bias; thus, in nonlinear geometries, the azimuth resolution is limited by the beamwidth and it is wavelength dependent. However, RRDP generates maps of reflectivity versus range and doppler even for very nonlinear geometries. While a preliminary detection/discrimination is feasible on the basis of range and doppler the false alarm rate may be too high. In general, the information of all the footprints is mapped onto an absolute x—y map prior to detection/discrimination. The classical mapping technique is not applicable in a nonlinear geometry, because the azimuth cells change in size, shape, and orientation. Therefore, an invariant mapping technique or method is used. The invariant mapping method is used to map information from arbitrary shaped cells onto an absolute x—y rectangular grid. Three typical applications of SAR imaging to nonlinear geometries have been analyzed through simulation. These applications are detection/discrimination of ground targets by a millimeter wave seeker for a downward trajectory, imaging large areas of ground by combining a linear forward motion with scanning, and mapping the ground below by performing SAR imaging with a horizontal circular trajectory.

As noted earlier RRDP makes pulse doppler radar feasible in nonlinear geometries where they are not currently applicable. Additionally, RRDP will improve the performance of existing pulse doppler radars. An important application is doppler beam sharpening. RRDP measures relative doppler, where the zero doppler reference in a range cell corresponds to a selected reference scatterer, fixed or moving. In the three applications discussed above the reference scatterer is at the center of the range cell. Measuring relative doppler is more accurate than measuring absolute doppler. Thus, RRDP can improve discrimination between target and decoys during missile reentry by using as doppler reference one of the objects being tracked. In astronomy, any celestial or man-made object can be used as doppler reference.

Invariant mapping is useful in merging information from various sources, the information to be merged can be generated by an active or a passive sensor. IM can be used to combine infrared and/or optical images, or to combine the information of dual mode systems such as infrared/microwave or infrared/millimeter waves. In short, IM should be very useful to merge the information from various sensors (sensor fusion). As set forth herein the information processed is reflectivity, but IM can be extended to the more general case of a feature information vector. Digital techniques exist to transfer data from arbitrary coordinates onto an x—y rectangular grid. The performance of invariant mapping is much better because it is an analog process and avoids quantization errors.

In conclusion, the new SAR imaging technique differs from the classical SAR in three key areas: range relative doppler processing, invariant mapping processing, and a better representation of round trip delay which allows accurate synthesis of a reference signal in each range cell. The RRDP/IM hardware differs from the classical hardware in two areas. Firstly, a synthetic signal synthesizer produces the reference signal for synchronous demodulation, and secondly a special purpose invariant mapping processor is used to implement IM.

DESCRIPTION OF THE PREFERRED EMBODIMENT

The synthetic aperture radar (SAR), using range relative doppler processing and invariant mapping, utilizes a conventional antenna to generate a radar beam as is done in established, classical SAR. The sideway footprint (broadside or squinted with respect to the velocity vector of the radar) illuminated by the radar beam is divided into contiguous range cells through range gating where range resolution is inversely proportional to bandwidth. Then, each range cell is partitioned into azimuth cells on the basis of doppler, where the doppler resolution is the inverse of the observation interval, $D_{ob}$. Classical SAR doppler processing assumes an horizontal trajectory with constant velocity so that a scatterer remains within the same range cell during the entire observation interval.

Figure 3A:
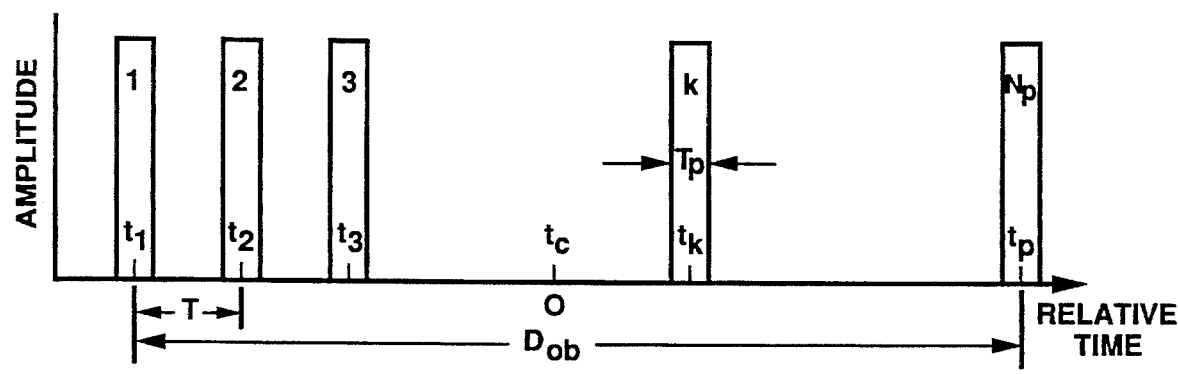
FIG. 3a is a drawing depicting the transmit pulses occurring during an observation interval.

Range Relative Doppler Processing (RRDP) together with the unique method of invariant mapping or invariant mapping (IM) technique extends the application of SAR to nonlinear geometries. To explain how the invention functions, let $C_i$ be a radar scatterer somewhere within the antenna footprint and let $r_i(t)$ (not shown) be the range from the antenna to $C_i$ during an observation interval, $D_{ob}$, at any relative time, t, where relative time is measured from a central time, $t_c$, as shown in FIG. 3a. Central time is the center of the observation interval, $D_{ob}$, as is well known in the art. The observation interval is limited by the constraint that the radar scatterer $C_i$ (not shown) remain within the same range cell during SAR processing. The observation interval must therefore satisfy the following relationship:

$$|r_i(0.5D_{ob})-r_i(-0.5D_{ob})|<\Delta R=T_p c/2 \qquad (1)$$

where $T_p=1/B$ is the pulse duration and c is the speed light. The parameters, $\Delta R$ and B, are the range interval and the system bandwidth, respectively. For the case of a nonlinear geometry, particularly in the forward looking mode, $r_i(t)$ varies rapidly with time and the scatterer does not stay very long within the same range cell. Correction must be made for movement of the antenna or $D_{ob}$ becomes too small to achieve the resolution desired for accurate mapping. To illustrate the impact on $D_{ob}$ by way of an example, assume for the $C_i$ scatterer that the round trip delay for the radar signal decreases with time over the observation interval. By making most of the variation in this round trip delay negligible, the problem of range walk that occurs with most synthetic aperture radars will be solved and $D_{ob}$ can be increased to achieve the desired azimuth resolution. This can be done by electronic phase compensation and is the basis for the RRDP. RRDP is implemented by mixing the actual radar returns from scatterers within the footprint with a synthetic signal in such a manner that range walk is virtually eliminated at the center of each range cell. This is explained hereinbelow. To eliminate the problems of range walk and of doppler bias, RRDP/IM requires a new and more sophisticated receiver/processor. The invariant mapping method or technique was developed to map the information from each azimuth cell, as generated by RRDP, onto an absolute x—y reflectivity map, even when the size and/or the orientation of the footprint varies. To provide a detailed explanation of RRDP, the $i^{th}$ unity scatterer (unit cross section) within the range cell is defined as $C(j,\mu_i,\in_i)$ where $(\mu_i,\in_i)$ are, respectively, the relative azimuth and elevation with respect to the center of the $j^{th}$ range cell. Also, a reference unity scatterer at the center of the $j^{th}$ range cell may be defined as $C^*(j,0,0)$. At the output of the mixer 34 in FIG. 1, the IF return pulse effected by the scatterer $C(j,\mu_i,\in_i)$ in response to the $k^{th}$ transmitted pulse is denoted as $\rho_k(t,j,\mu_i,\in_i)$ where $k=1,2,\ldots,N_p$ and where $N_p$ is the total number of pulses transmitted during the observation interval.

Figure 3B:
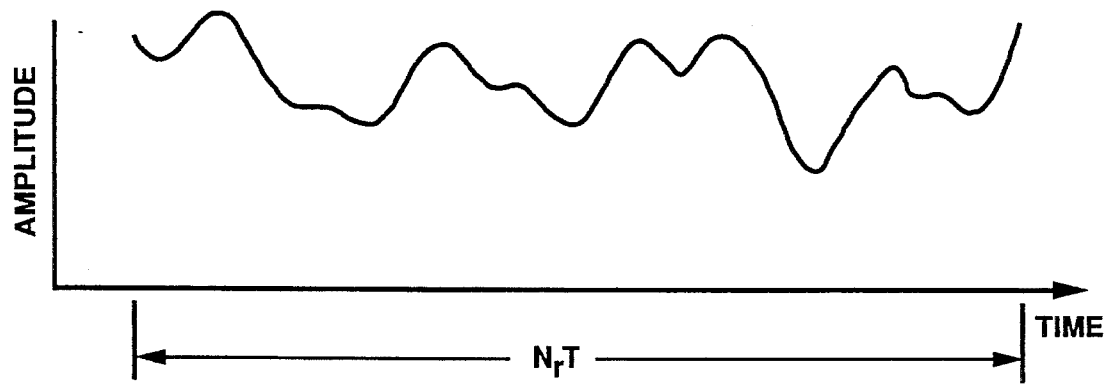
FIG. 3b is a typical single pulse return from all scatters for a given pulse.

Referring in general to the drawings wherein like numbers refer to like parts, FIG. 3a shows a typical transmit waveform. FIG. 3b represents, for a single transmit pulse, the amplitude of a typical return pulse from all scatterers within the footprint. The $k^{th}$ transmit pulse is centered at time $$t_k=0.5T(2k-N_p-1) \qquad (2)$$

where T is the interpulse time. For this pulse, the round trip delay between $C(j,\mu_i,\in_i)$ and the antenna is $\tau_k(t_k,j,\mu_i,\in_i)$. Most of the energy of $\rho_k(t,j,\mu_i,\in_i)$ is concentrated in the interval $$\{t_k-T_p/2+\tau_k(t_k,j,\mu_i,\in_i),\ t_k+T_p/2+\tau_k(t_k,j,\mu_i,\in_i)\}. \qquad (3)$$

For simplicity, spillover into the adjacent range cells, which is due to the finite system bandwidth, is omitted; however, spillover is accounted for in the synthetic signal synthesizer 12 of FIGS. 1 and 2 as set forth hereinbelow. The return pulse at the output of the mixer 34 that would be effected by $C^*(j,0,0)$ in response to the $k^{th}$ transmitted pulse is $\rho_k(t,j,0,0)$ and the corresponding round trip delay is $\tau_k(t,j,0,0)$. Let $$\tau^*(j)=\tau(0,j,0,0) \qquad (4)$$

be the round trip delay to $C^*(j,0,0)$ at central time. The round trip delay to $C^*(j,0,0)$ at an arbitrary time t is $$\tau_k(t,j,0,0)=\tau^*(j)+\delta_k(t,j,0,0). \qquad (5)$$

The objective is to remove most, if not all of $\delta_k(t,j,0,0)$ so that $C^*(j,0,0)$ will be detected at zero relative doppler frequency. This is accomplished by synchronous detection of the IF return $\rho_k(t,j,0,0)$ with a IF synthetic signal $\{\sigma_{dk}(t,j,0,0)=I_3,\ \sigma_{qk}(t,j,0,0)=Q_3\}$. The IF synthetic signal is composed of two IF quadrature components $I_3$ and $Q_3$, each of which is modulated to compensate for the phase variation contributed by $\delta_k(t,j,0,0)$. The generation of the synthetic signal is discussed in detail hereinbelow.

For synchronization and timing purpose a time grid is defined over the observation interval $D_{ob}$. This grid is centered at $t_c$ and has time increment $T_p=1/B$. The transmit times $\{t_k\}$ are also on the time grid, where the time interval between transmitted pulses is $T=MT_p$ where M is a large integer. It follows that the centers of the range cells $\{C^*(j,0,0)\}$ exactly correspond to time grid points at central time. However, the round trip time to $C^*(j,0,0)$ is not an integer number of $T_p$ outside of central time, because of range walk. This is taken into account in the synthetic signal synthesis as shown in equation (35) hereinbelow.

More generally, the round trip delay of the return pulse effected by an arbitrary unity scatterer $C(j,\mu_i,\in_i)$ is written as $$\tau_k(t,j,\mu_i,\in_i)=\tau^*(j)+\delta_k(t,j,0,0)+\Delta_k(t,j,\mu_i,\in_i), \qquad (6)$$

where $$\Delta_k(t,j,\mu_i,\in_i)=\delta_k(t,j,\mu_i,\in_i)-\delta_k(t,j,0,0). \qquad (7)$$

In this case synchronous detection with the synthetic signal compensates only for $\delta_k(t,j,0,0)$ so that the relative doppler frequency is a function of $(\mu_i, \epsilon_i)$. When the cross section of the scatterer differs from unity, this does not affect RRDP which depends only on round trip delay and doppler.

Now assuming that the $j^{th}$ range cell contains three unity scatterers as defined by $C(j,\mu_i,\epsilon_i), i=1,2,3$. These scatterers will be detected as three sinewaves where the frequency (or relative doppler frequency) of the $i^{th}$ sinewave is essentially proportional to $\mu_i$. This indicates that discrimination is feasible by resolving the three frequencies.

Thus far, focus has been on a single range cell in the footprint. If a small error due to spillover is neglected, the phase correction, corresponding to the cancellation of $\delta_k(t,j,0,0)$, is performed simultaneously in all the returns due to the $k^{th}$ transmitted pulse by using a combined synthetic signal which is the sum of the synthetic signals for each range cell. This summation is expressed as $$\sigma_{dk}(t) = \sum_{j=1}^{N_r} \sigma_{dk}(t,j,0,0) \quad (8)$$

$$q_k(t) = \sum_{j=1}^{N_r} \sigma_{qk}(t,j,0,0) \quad (9)$$

where $N_r$ is the total number of range cells in the footprint that are to be processed. This procedure is repeated $N_p$ times during an observation interval.

Figure 1:
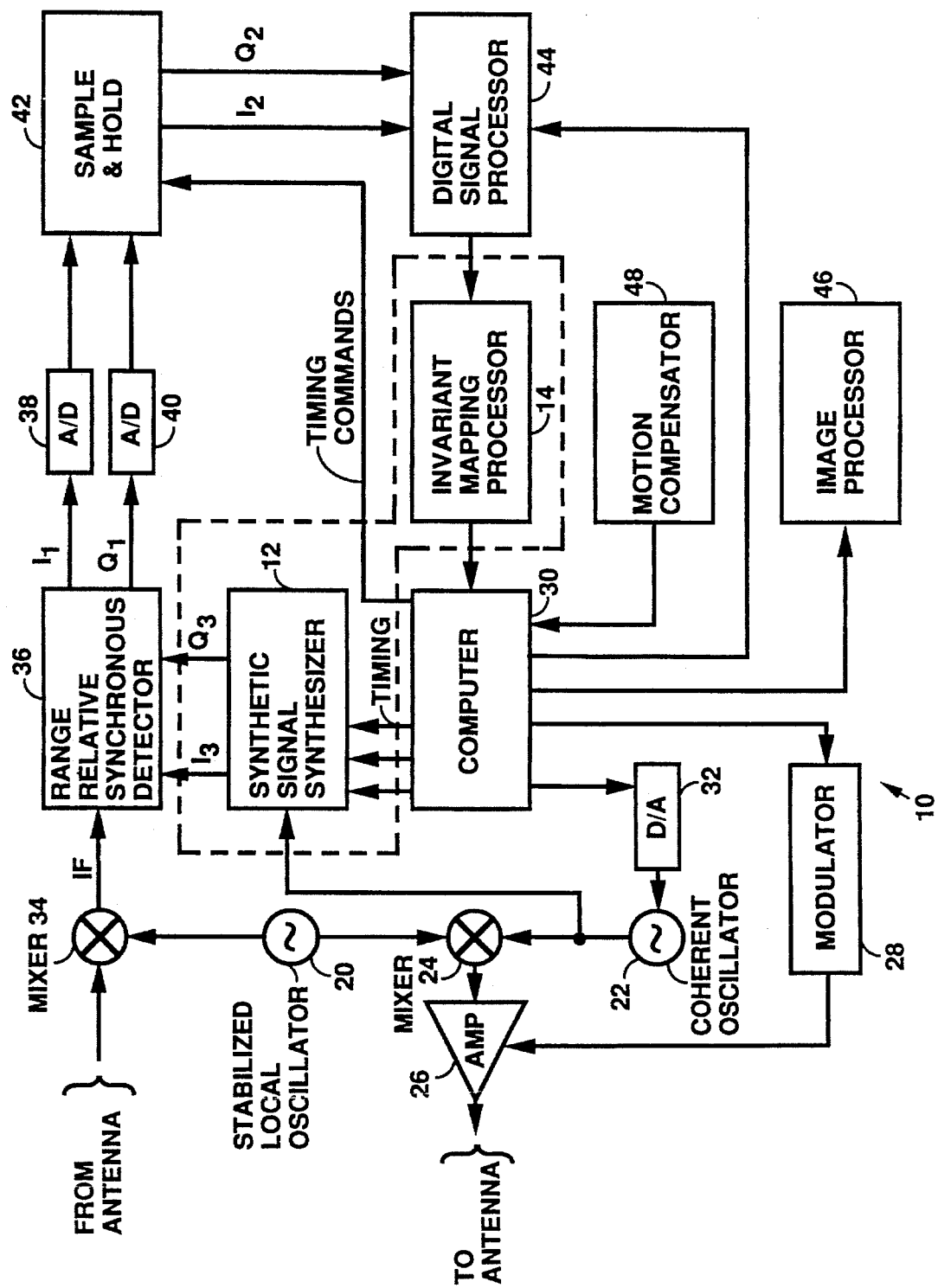
FIG. 1 is a block diagram of a generalized synthetic aperture radar employing range relative processing.
Figure 2:
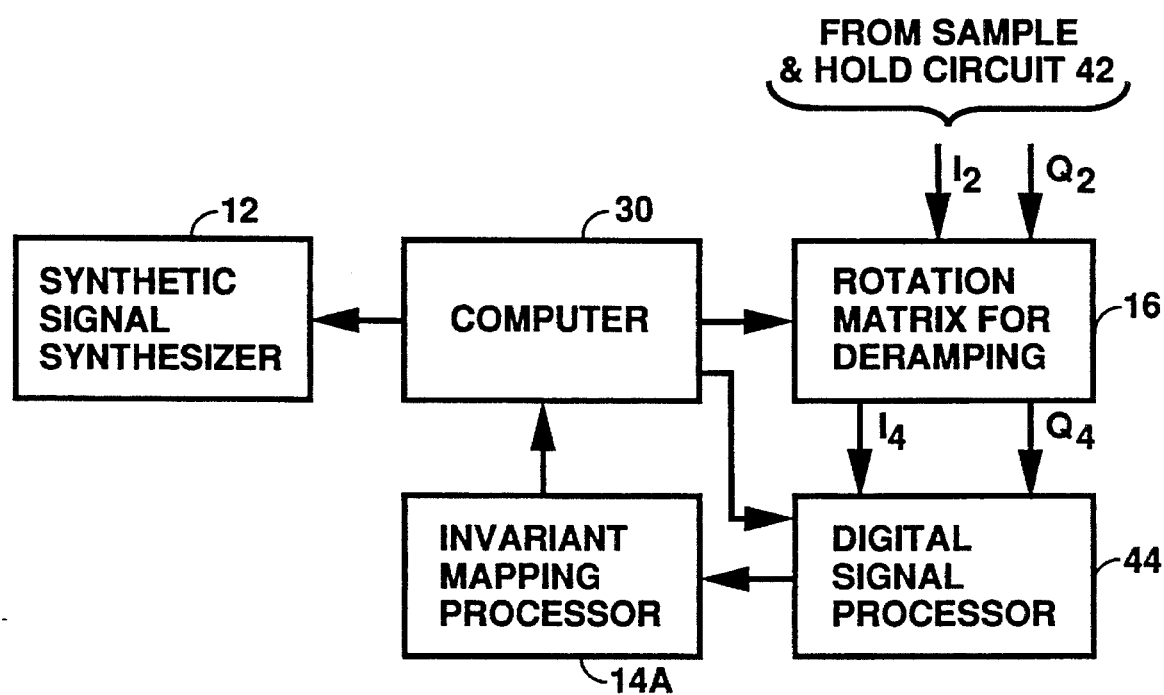
FIG. 2 is a block diagram showing a rotation matrix circuit coupled into the system of FIG. 1 for deramping.
Figure 5:
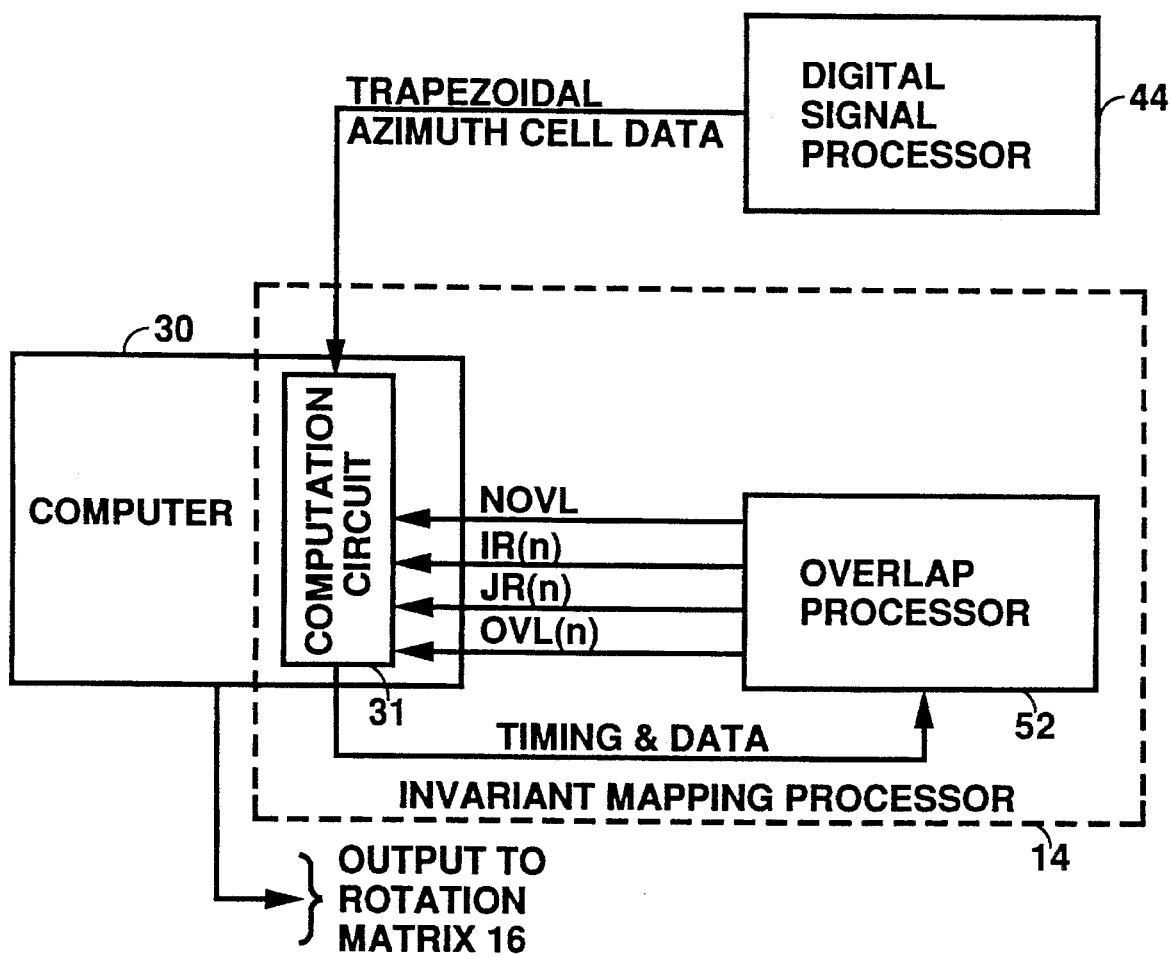
FIG. 5 is a more detailed block diagram of the invariant mapping processor of FIGS. 1 and 2.

FIGS. 1 and 2 disclose two forms of implementation of RRDP. The critical elements of these figures are the synthetic signal synthesizer, the invariant mapping processor, and the range relative deramper (FIG. 2 only). The invariant mapping processor comprises an overlap processor and a dedicated computer. More precisely, the computer 30 has two sections: one for general purpose control, computation, timing, and one dedicated to IM. The interaction between the computer 30 and the overlap processor is depicted in FIG. 5.

Referring more particularly to FIGS. 1 and 2, two implementations are disclosed of a generalized, established synthetic aperture radar (SAR) that has been changed to include range relative doppler processing and invariant mapping for nonlinear trajectories. In FIG. 1, the SAR improvement comprises a synthetic signal synthesizer 12, and an invariant mapping processor 14. FIG. 2 also includes a rotation matrix 16.

Rotation matrix 16 provides range relative deramping and is shown in FIG. 2. Invariant mapping processor 14 is shown in more detail in FIG. 5 and includes an overlap processor 52 and a dedicated computer circuit 31. This circuitry is discussed hereinbelow.

In operation of a typical SAR, signals from a stabilized local oscillator 20 and from a coherent oscillator 22 are coupled to a mixer 24 which provides a carrier output to an amplifier 26. The carrier is modulated by outputs coupled from a modulator 28 to the transmitter and a signal to be transmitted is then coupled to the antenna (not shown). A computer 30 has outputs coupled to the modulator 28 to provide transmit waveform generation commands thereto and coupled through a digital-to-analog converter (D/A) 32 to oscillator 22 to control operation of the oscillator. A received signal from the antenna (not shown) is combined in mixer 34 with an output signal from the local oscillator 20 and provides a resultant intermediate frequency (IF) signal to a range relative synchronous detector 36. The inphase (I) and quadrature (Q) components of the IF signal are output coupled from detector 36. These signal components ($I_1$ and $Q_1$) are processed respectively through analog-to-digital converters 38 and 40 to sample and hold circuit 42 and from there are coupled as $I_2, Q_2$ to a digital signal processor 44.

The output from processor 44 would conventionally be coupled (not shown) back to a computer (30) and the process repeated. Additionally, an output from the system is coupled from computer 30 to an image processor 46 or other circuit to display the information received on the returned signal, timing commands are coupled from computer 30 to sample and hold circuit 42 to control operation thereof, and control commands are coupled to the digital signal processor 44.

As shown in FIG. 1, however, the generalized SAR is modified by the invariant mapping processor 14 disposed between digital signal processor 44 and computer 30; and further by the synthetic signal synthesizer 12 disposed to receive synthesized command signals from computer 30 and to provide I&Q (Inphase and Quadrature) signals to detector 36. Synthesizer 12 also receives a synchronization signal from coherent oscillator 22.

With the synthetic signal synthesizer 12 and invariant mapping process 14 in the system of FIG. 1, complete phase correction is performed through synchronous detection with a synthetic signal. During an observation interval the analog quadrature components from the incoming signal, $I_1$ and $Q_1$, are digitized in the two A/D converters 38 and 40. The discrete data is then collected over all pulses and range cells and stored in the sample and hold circuit 42. After the data collection for the observation interval has been completed, digital processing is performed in processor 44 under computer 30 control.

The quadratic phase variation inherent in the IF signal is removed during synchronous detection in detector 36 by combination with the synthetic I and Q output signal from synthetic signal synthesizer 12 so that the resultant I and Q output that is ultimately coupled from sample and hold circuit 42 is essentially free of the quadratic phase variation.

FIG. 2 discloses an alternative embodiment to that of FIG. 1. Since the majority of the components and signal flow is identical to that of FIG. 1, only a portion of the circuit is shown with reference to interconnected circuitry in FIG. 1.

FIG. 2 differs from FIG. 1 in several ways: (1) the computer 30 does not provide quadratic phase information to the synthetic signal synthesizer 12; (2) the I&Q output of the signal synthesizer 12 in FIG. 2 does not include the quadratic phase synthesis, even though the hardware is the same; and (3) a rotation matrix 16 is needed to remove the quadratic phase remaining after synchronous detection under the control of the computer 30A. In this embodiment, phase correction is achieved in two steps-synchronous detection 36 and deramping which is provided by rotation matrix 16. Synchronous detection is now performed with a simplified synthetic signal which does not include the quadratic phase variation inherent in $\delta_k(t,j,0,0)$. The A/D conversion from circuits 38 and 40, and the data collection in the sample and hold device 42 are the same as previously described. The difference is that range relative deramping 16 is performed prior to digital signal processing 44 to remove the quadratic phase variation in $\delta_k(t,j,0,0)$. Computer 30 provides the sequence of phase rotation angles to the rotation matrix 16 to accomplish deramping. An algorithm that can be used in accomplishing this is described by equation (11.a, 11.b, and 11.c).

Implementation of RRDP/IM utilizes an accurate Taylor expansion of round trip delay about a reference scatterer $C(j,\mu_i,\epsilon_i)$ at the center of each range cell and is performed by computer 30 in response to input data from a motion compensator 48.

In range relative doppler processing the heterodyning signal is linearly frequency modulated over the range cells in the footprint so that for each range cell the center of the range cell appears exactly as zero doppler. This minimizes range walk and doppler bias over the entire footprint.

For practical implementation, the only coefficients needed for an accurate Taylor representation of range within a range cell are $\tau^*(j), \overline{\tau}_1(j) \overline{\tau}_{11}(j) \overline{\tau}_{12}(j)$, and $\overline{\tau}_{112}(j)$. Details for computation of these Taylor coefficients are in Appendix A, discussed attached hereto and with reference to FIG. 12. The computer predicts a flight path for the observation interval using standard trajectory estimation methods. The computation of the coordinates for an apex is performed in two steps: (1) computation of relative azimuth, μ, from doppler, again based on accurate Taylor representation; and (2) computation of {x,y} given μ and range. This computation takes place in computer 30. In FIG. 1, the synthesizing command inputs from computer 30 to synthesizer 12 make use of the first three coefficients of the Taylor expression. For FIG. 2, the first and second coefficients are required to compute the synthetic signal and the third one is needed by the rotation matrix 16 to implement the deramping. In the embodiments of FIGS. 1 and 2, the fourth and fifth coefficients are used by the invariant mapping processor 14 to compute the apex coordinates of each azimuth cell since these coefficients establish the relationship between azimuth and doppler frequency.

The SAR operation consists of two main steps: (1) collecting a $N_p$ by $N_r$ matrix of I/Q samples where a column corresponds to a particular range cell and a row to a particular pulse; and (2) digital processing and mapping of the I/Q matrix information. The matrix is a complex matrix (composed of complex numbers) where the real and imaginary parts are stored in the sample and hold circuit 42. The matrix is denoted as $$x_d(k,j), x_q(k,j) \text{ for } k=1, N_p \text{ and for } j=1, N_r. \tag{10}$$

In the rotation matrix 16 deramping provides discrete phase correction. After all data has been collected and stored in the sample and hold (S and H) circuit 42, computer 30 sends timing commands to S and H circuit 42 to initiate release of the data to the rotation matrix. Deramping is performed as a matrix rotation on the I and Q data from the sample and hold circuit in conjunction with timing commands and sequence value signals from computer 30. The resultant $I_4$ and $Q_4$ output from the rotation matrix is input to digital signal processor 44. The rotation matrix function is provided by a digital signal processing chip, such as the Intel 80287, which is programmed using conventional programming methods to perform the deramping operations.

In the embodiment of FIG. 1, the quadratic phase variation inherent in $\delta_k(t,j,0,0)$ is essentially removed from the matrix components $\{x_d(k,j)=I_2, x_q(k,j)=Q_2\}$ during synchronous detection with the synthetic signal $I_3$ and $Q_3$. However, for FIG. 2, the discrete phase correction referred to herein as deramping, takes place in the rotation matrix 21 and is performed as follows. After all data have been collected and stored in the sample and hold block 42, the computer 30 sends a timing command to the sample and hold circuit to begin releasing the data to the rotation matrix 16. Let $\{x'_d(k,j)=I_4, x'_q(k,j)=Q_4 \text{ for } j=1,2,\ldots,N_r\}$ denote the I/Q discrete sequence for the $j^{th}$ range cell after deramping has occurred. Then from complex signal theory, $$x'_d(k,j) = x_d(k,j)\cos \Delta\phi(k,j) - x_q(k,j)\sin \Delta\phi(k,j) = I_4 \tag{11a}$$

$$x'_q(k,j) = x_d(k,j)\sin \Delta\phi(k,j) + x_q(k,j)\cos \Delta\phi(k,j) = Q_4 \tag{11b}$$

where $$\Delta\phi(k,j) = -w_o(t^2/2)\overline{\tau}_{11}(j) \tag{11c}$$

and $w_o$ denotes the carrier frequency output from mixer 34 in rad/s. The sequence $\{x'_d(k,j),=I_4, x'_q(k,j)=Q_4 \text{ for } j=1,N_r\}$, which is the output of the rotation matrix, is input to the digital signal processor 44.

Invariant mapping circuit 14 transfers the reflectivity information, which has been collected for all doppler cells onto an absolute xy reflectivity map where x and y are typically expressed in meters. This change from range and doppler frequency coordinates to x—y coordinates is performed for each range cell and for all doppler cells within each range cell that are within the footprint. This mapping method differs from those which have been used in classical SAR because it does not depend upon a linear, horizontal trajectory nor upon a constant velocity.

Figure 6:
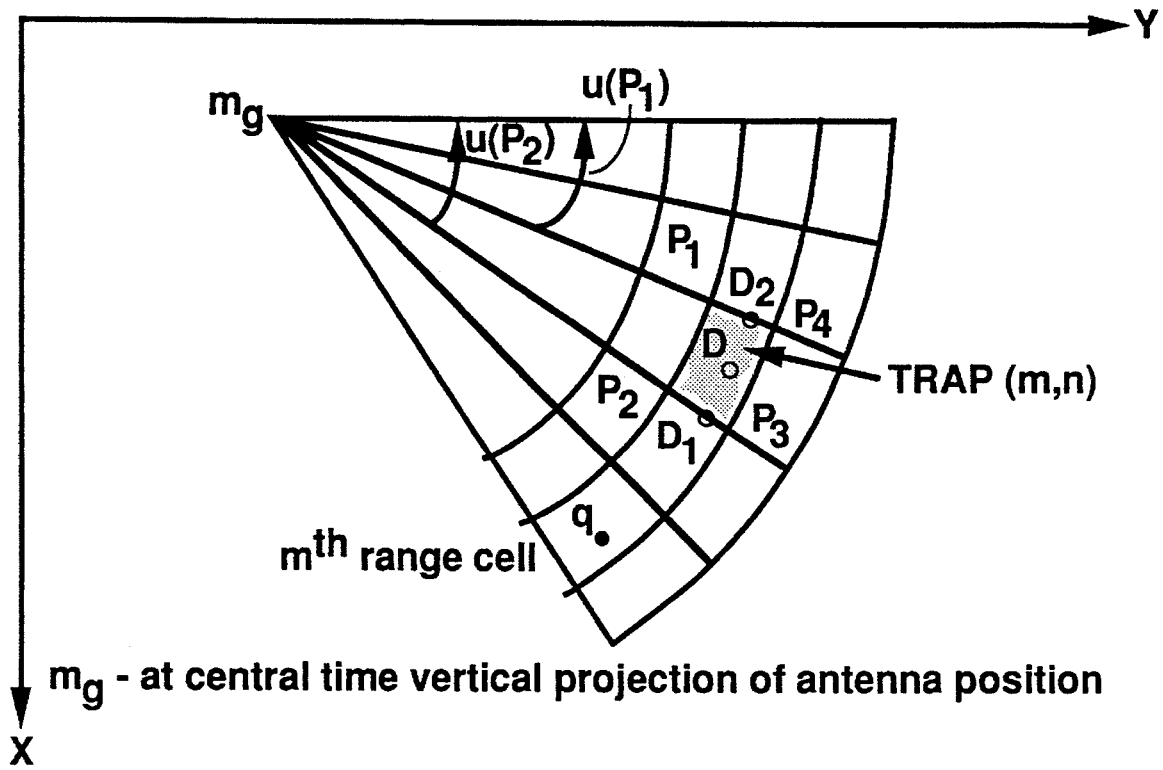
FIG. 6 defines a trapezoidal azimuth cell in the range/doppler domain as viewed within the ground plane.

More precisely the mapping is performed in two steps: (1) the corner of the doppler cell are mapped into the x—y apices of the trapezoidal azimuth cell, and (2) the reflectivity information of the trapezoidal azimuth cell is transferred and accumulated onto an absolute x—y reflectivity map composed of small rectangular cells. The layout of the rectangular x—y grid is established according to standard techniques before mapping of the absolute reflectivity can occur. The grid is represented within computer 30 as a two-dimensional matrix, using conventional programming methods. The estimated reflectivity of each rectangular azimuth cell, within the x—y map is based upon the reflectivity information of every azimuth cell which has been defined in terms of range and doppler frequency and which has a partial or complete overlap with the rectangle. As shown in FIG. 6, these azimuth cells are substantially trapezoidal in shape and are denoted as trapezoidal azimuth cells to distinguish them from the rectangular doppler cells. The reflectivity information transferred from a trapezoidal azimuth cell to overlapping rectangular grid cells is weighted in proportion to the area of overlap and allows for missing data or redundant data from other azimuth cells.

The information transferred from a trapezoidal cell to an overlapping x—y rectangular cell consists of two data: (1) overlap area, and (2) product of overlap area times reflectivity density. After mapping all the trapezoidal cells, the estimated reflectivity density of a particular x—y rectangle is equal to the sum of the products divided by the sum of the overlaps. This analog weighting minimizes quantization effects. However, the computation of the areas of overlap is accomplished more efficiently, as shown in FIG. 5, by using a special computation circuit 31 within computer 30 in conjunction with the overlap processor 52. For example, any of the Motorola 68000 series microprocessors and the 68881 or 68882 coprocessors can be used for both computer 30 and special computation circuit 31. Thus, IM is performed jointly by the overlap processor 52 and the computer special computation circuit 31.

Required from the digital signal processor 44 by computation circuit 31 are three outputs for each trapezoidal azimuth cell in each range cell. These are reflectivity, range index m, and FFT (doppler frequency) index n. The value for m denotes a particular range cell and the value for n denotes a particular trapezoidal azimuth cell within that range cell. Each trapezoidal azimuth cell has four apices which are expressed in terms of x—y coordinates.

Figure 7:
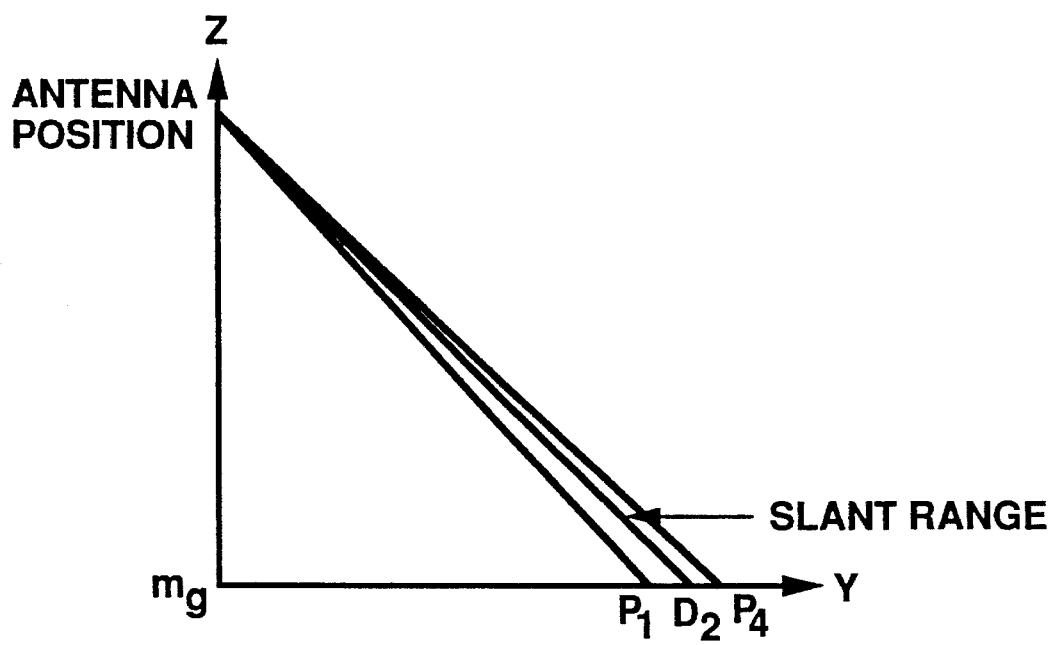
FIG. 7 shows a vertical perspective of a trapezoidal azimuth cell in the range/doppler domain as viewed within the vertical plane.

FIGS. 6 and 7 disclose respective ground plane and vertical plane views of a trapezoidal azimuth cell. Typically, one azimuth cell has indices (m,n) to be mapped onto an absolute x—y grid. The modulus of the FFT cell with indices (m,n), where m corresponds to range and n to doppler frequency, is transformed into a normalized cross section. This cross section is discussed further as Cross (m,n) hereinbelow. This involves two steps: a range gain correction to match a selected reference range, and an antenna gain correction based on the antenna pattern. The reflectivity density of the trapezoidal azimuth cell is defined as the ratio of the return amplitude for that cell (modulus of the FFT cell compensated for gain variations) to the area of the trapezoid. The following operations take place: (1) the computation circuit 31 computes the reflectivity density of the azimuth cell using the return amplitude passed by digital signal processor 44, (2) the computation circuit 31 defines the smallest rectangular window which contains the trapezoidal cell, (3) the overlap processor 52 computes the areas of overlap between the trapezoidal azimuth cell and each rectangular azimuth cell within the rectangular window, and (4) computation circuit 31 processes the overlap information from overlap processor 52 in two steps. Firstly, computer 30 computes for each rectangular cell in the window the product of the area of overlap by the reflectivity density. Secondly, circuit 31 accumulates in all the rectangular cells of the x—y map within the rectangular window two types of data—the areas of overlaps, and the products of the areas of overlap noted above. This procedure is repeated for all the azimuth cells. When mapping of all the azimuth cells (in one footprint or in a sequence of footprints) is completed, the reflectivity map is generated. The estimated reflectivity density for a particular rectangular cell is equal to the accumulated product divided by the accumulated area. As more information becomes available through another sequence of footprints, which may be of different size and orientation, the accumulation of the overlap areas and of the products is continued so that an even better estimate of reflectivity density map is obtained.

While there are other approaches to the computation of overlap, the algorithm that has been developed, is a critical component of IM because it allows the sequence of overlaps to be computed in real time. For a missile system or other such system which depends upon radar imaging for detection/discrimination of targets, this real time computation is crucial.

Synthetic Signal Generation

The function of the synthetic signal synthesizer 12, FIGS. 1 and 2, is to generate a signal which accurately emulates the phase of a signal that would be returned from the reference scatterer in the $j^{th}$ range cell to allow implementation of a phase correction that virtually eliminates the range walk associated with the reference scatterers and also minimizes the range walk associated with other scatterers within the range cell. The basis for this elimination and minimization has been noted hereinabove. In deriving the synthetic signal, let $w_{slo}$ denote the angular (radian) frequency of the stabilized local oscillator 20, and $w_{co}$ denote the angular frequency of the coherent oscillator 22, and the output ($w_o$) the output from mixer 24 is $$w_o = w_{slo} + w_{co}. \quad (12)$$

Let $C^*(j,0,0)$ and $C(j,\mu_i,\epsilon_i)$ denote, respectively, the reference scatterer and the arbitrary $i^{th}$ scatterer within the $j^{th}$ range cell. Thus, the received signal at mixer 34 for the $i^{th}$ scatterer in the $j^{th}$ range cell in response to the $k^{th}$ transmitted pulse is $$A_{k,j,i}(t)\cos w_o[t-t_k-\tau_k(t,j,\mu_i,\epsilon_i)] \quad (13)$$

where the round trip delay, defined in equation (6), is the transmit time for the center of the rf pulse. The amplitude $A_{k,j,i}(t)$ is also a function of antenna gain and range. The required amplitude compensation is performed in digital signal processor 44 prior to mapping. This compensation is the same as for the classical approach. For all scatterers in the $j^{th}$ range cell and for the $j^{th}$ range cell and for the $k^{th}$ transmit pulse, the received IF signal from mixer 34 is $$P_k(t,j) = \sum_{i=1}^{N_j} P_k(t,j,\mu_i,\epsilon_i), \quad (14)$$

where $N_j$ is the number of scatterers in the $j^{th}$ range cell and the superposition principle is used. For the entire footprint, the received IF signal corresponding to the $k^{th}$ transmit pulse is by superposition $$P_k(t) = \sum_{j=1}^{N_r} P_k(t,j). \quad (15)$$

The return pulses defined by $\{P_k(t)$ for $k=1, N_p\}$ form a set of nonoverlapping signals. They are combined into a signal $\rho(t)$ which spans the complete observation interval. The combined return satisfies $N_r T_p < T$ and is expressed as:

$$P(t) = \sum_{k=1}^{N_p} P_k(t) \quad \text{for } -D_{ob}/2 \le t \le D_{ob}/2. \quad (16)$$

Since the superposition principle applies, only the processing of a single scatterer within a range cell warrants further discussion. When the received signal given by equation (13) is heterodyned in mixer 34 with $w_{slo}$ from oscillator 20, the IF Signal, expressed as $$P_k(t,j,\mu_i,\epsilon_i) = A_{k,j,i}(t)\cos w_o[t-P_k(t,j,\mu_i,\epsilon_i)]\cos w_{slo} \quad (17)$$

is obtained. Now $P_k(t,j,\mu_i,\epsilon_i)$ is expanded to yield $$P_k(t,j,\mu_i,\epsilon_i)=0.5A_{k,j,i}(t)\{\cos[w_o t+w_{slo}t-w_o\tau_k(t,j,\mu_i,\epsilon_i)]+\cos[w_o t-w_{slo}t-w_o\tau_k(t,j,\mu_i,\epsilon_i)]\}. \quad (18)$$

Figure 4:
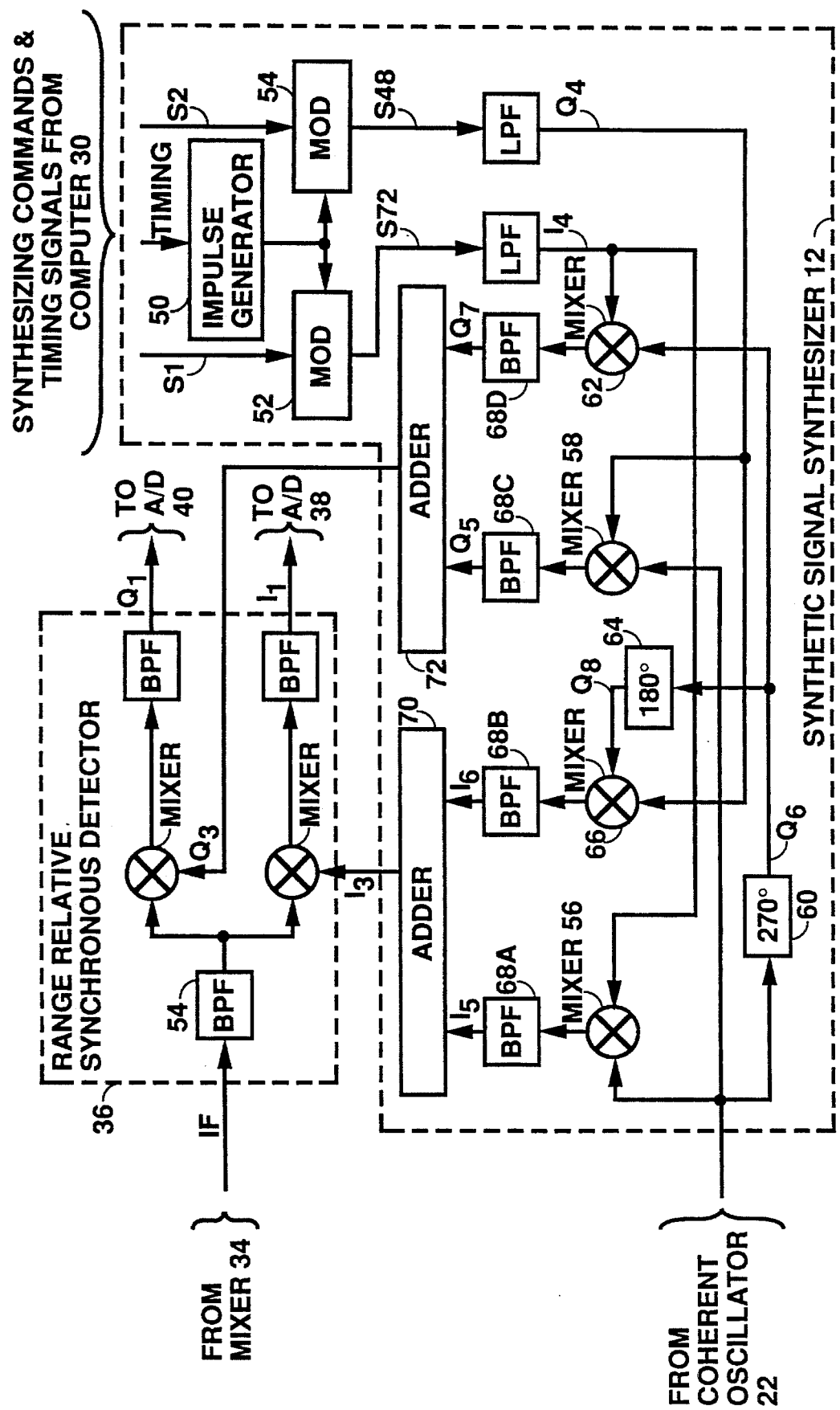
FIG. 4 is a block diagram of a synchronous detector and synthetic signal synthesizer for providing frequency synthesis and synchronous detection.

The 0.5 factor, a scaling factor which is easily compensated for using conventional techniques, is neglected. As shown in FIG. 4, a bandpass filter 54 in detector 36 is centered at $w_{co}$ ($w_{co}=w_o-w_{slo}$) and eliminates the sum frequency ($w_o+w_{slo}$). The output of bandpass filter 54 is $$P_k(t,j,\mu_i,\epsilon_i)=A_{k,j,i}(t)\cos[w_{co}t-w_o\tau_k(t,j,\mu_i,\epsilon_i)]. \quad (19)$$

However, $\tau_k(t,j,\mu_i,\epsilon_i)$ has been previously expanded as noted in equations (6) and (7). Hence, $$P_k(t,j,\mu_i,\epsilon_i) = A_{k,j,i}(t)\cos\{w_{co}t - w_o[\tau^*(j) + \delta_k(t,j,\mu_i,\epsilon_i)]\} = A_{k,j,i}(t)\{\cos[w_{co}t - w_o\tau^*(j) - w_o\delta_k(t,j,\mu_i,\epsilon_i)]\}. \quad (20)$$

Since $$\delta_k(t,j,\mu_i,\epsilon_i)=\delta_k(t,j,0,0)+\Delta_k(t,j,\mu_i,\epsilon_i) \quad (21)$$

the third component of the phase, which contains scatterer information, is expressed as the sum of two phase terms $$-w_o\delta_k(t,j,\mu_i,\epsilon_i)=\phi^*_k(t,j,0,0)+\phi_k(t,j,\mu_i,\epsilon_i), \quad (22)$$

where $\phi^*_k$ and $\phi_k$ are defined in equations (23) and (24), respectively.

The $\phi^*_k$ term is precomputed and then subsequently cancelled through synchronous detection; this is the basis of RRDP. The computation of $\phi^*_k$ is done as follows. The round trip delay to an arbitrary scatterer, $C(j,\mu_i,\epsilon_i)$, is derived from an accurate Taylor expansion about the $j^{th}$ reference scatterer at central time.

$$\phi^*_k(t,j,0,0) = -w_o\{\tau^*(j) + t\bar{\tau}_1(j) + (t^2/2)\bar{t}_{11}(j)\} \quad (23)$$

$$\phi_k(t,j,\mu_i,\epsilon_i) = -w_o\{\tau^*(j) + \bar{\tau}_3(j)\epsilon_i + t\,(\bar{\tau}_{12}(j)\mu_i + \bar{\tau}_{13}(j)\epsilon_i + \bar{\tau}_{122}(j)\mu_i^2/2) + (t^2/2)(\bar{\tau}_{112}(j)\mu_i + \bar{\tau}_{113}(j)\epsilon_i)\}. \quad (24)$$

For practical implementation, only the coefficients for the dominant terms are included: $\tau^*(j)$, $\bar{\tau}_1(j)$, $\bar{\tau}_{11}(j)$, $\bar{\tau}_{12}(j)$, and $\bar{\tau}_{122}(j)$ (This is discussed in greater detail in Appendix A). Conventional programing techniques are used for implementing these equations into Computer 30.

Ideally, synchronous detection of the return in the $j^{th}$ range cell should be performed with a synthetic signal composed of two quadrature components, as previously set forth, and which represents the return of the reference scatterer for the $j^{th}$ range cell. These two quadrature components are $$\sigma_{dk}(t,j) = \cos[w_{co}t + \phi^*_k(t,j,0,0)] = I_3 \quad (25a)$$

$$\sigma_{qk}(t,j) = \sin[w_{co}t + \phi^*_k(t,j,0,0)] = Q_3, \quad (25b)$$

where most of the energy is concentrated in the interval given by equation (3), although there is some spillover into adjacent range cells.

Assuming that there are 3 scatterers in the $j^{th}$ range cell as given by equation (8), the inphase $I_1$ and quadrature $Q_1$ components at the output of the Synchronous Detector 36 are given by $$x_{dk}(t,j) = \sum_{i=1}^{3} A_{kji}(t)\cos\{\phi_k(t,j,\mu_i,\epsilon_i) - w_o\tau^*_j\} = I_1 \quad (26a)$$

$$x_{qk}(t,j) = \sum_{i=1}^{3} A_{kji}(t)\sin\{\phi_k(t,j,\mu_i,\epsilon_i) - w_o\tau^*_j\} = Q_1, \quad (26b)$$

respectively where, again, most of the energy is concentrated in the interval given by equation (3). The instantaneous relative doppler frequency for the $i^{th}$ scatterer is obtained by taking the derivative of the phase in equations (26), $$f(t,j,i) = 1/2\pi d/dt\{\phi_k(t,j,\mu_i,\epsilon_i) - w_o\tau^*_j\} \quad (27a)$$

$$-f_o\{\bar{\tau}_{12}(j)\mu_i + \bar{\tau}_{122}(j)\mu_i^2/2\} \quad (27b)$$

where $f_o = w_o/2\pi$. Thus the scatterers appear as a sum of three sinewaves and discrimination is possible if the difference in relative doppler is greater than $\Delta f = 1/D_{ob}$. Since the duration of $\{x_{dk}(t,j),x_{qk}(t,j)\}$ is essentially $T_p = 1/B$ only one pair of samples is needed. Thus A/D converters 38 and 40 provide an input to the digital signal processor 44 for the $j^{th}$ range cell given by $$x_d(k,j) = x_{dk}(t_{k,j}) = I_2. \quad (28a)$$

$$x_q(k,j) = x_{qk}(t_{k,j}) = Q_2. \quad (28b)$$

Over the observation interval $N_p$ sample pairs are collected for the $j^{th}$ range cell and a total of $N_pN_r$ over all range cells. A discrete Fourier analysis on the complex sequence $$\{x_d(k,j)x_q(k,j) \text{ for } k=1, N_p\} \quad (29)$$

provides doppler resolution for the $j^{th}$ range cell.

In FIG. 2 the synthetic signal out of the signal synthesizer 12 represents the return of all the reference scatterers.

$$\sigma_{dk}(t) = \sum_{j=1}^{N_R} \sigma_{dk}(t,j) \quad (30a)$$

$$\sigma_{qk}(t) = \sum_{j=1}^{N_R} \sigma_{qk}(t,j) \quad (30b)$$

for $-D_{ob}/2 < t < D_{ob}/2$. Since the contributions of the $N_r$ reference scatterers are essentially nonoverlapping, the error introduced by summation is quite small.

The practical implementation in FIG. 2 differs from the ideal implementation in three ways. Firstly, the synthetic signal synthesizer 12 synthesizes only the linear phase in $\phi_k(t,j,\mu_i,\epsilon_i)$ which assures a rectangular envelope within each range cell. Thus equation (25) becomes $$\sigma_{dk}(t,j) = \cos(w_{co}t - w_o\bar{\tau}_1(j)t) \quad (31a)$$

$$\sigma_{qk}(t,j) = \sin(w_{co}t - w_o\bar{\tau}_1(j)t). \quad (31b)$$

Secondly, the synthetic signal is combined for all the reference scatterers as in equation (30). Thirdly the instantaneous relative doppler frequency for the $i^{th}$ scatterer is now given by $$f(t,j,i) = -f_o\{t\bar{\tau}_{11}(j) + \bar{\tau}_{12}(j)\mu_i + \bar{\tau}_{122}(j)\mu_i^2/2\}. \quad (32)$$

This indicates that the frequency varies linearly with time instead of being constant, because the quadratic phase variation is not cancelled by the synthetic signal. Thus the complex sequence $$\{x_d(k,j),x_q(k,j) \text{ for } k=1,N_p\} \quad (33)$$

includes a quadratic phase variation which must be removed prior to digital signal processing 44. This is accomplished with the matrix rotation (deramping) defined in equation (11).

Signal Generation and Flow—Range Relative Doppler Processing

FIG. 2 discloses the overall range relative doppler processing method. Generally, FIG. 2 shows a coherent radar, similar to the conventional synthetic aperture radar, except for the insertion of the synthetic signal synthesizer 12, the rotation matrix 16 (which provides the functions of equations 11.a and 11.b), and the invariant mapping processor 14. The function of the three blocks is discussed in conjunction with FIGS. 1 and 2. The circuit of FIG. 1 is identical to FIG. 2 except that the rotation matrix 16 is not needed because the signal synthesis performed by the synthesizer 12 includes the quadratic phase. Invariant mapping processor 14 consists of both hardware (digital) and software (algorithm) and provides the primary output, which is an x—y map of a single footprint or of a sequence of footprints.

The synchronous detector 36 uses standard hardware to mix the synthetic signal with the IF from mixer 34. It is called Range Relative Synchronous Detector because the synthetic signal is not made of sinewaves and because it varies with each range cell.

Spatial position information, consisting of position and change of position data, is derived from motion compensation network 48 that is contained within the radar platform. A carrier signal from mixer 24 is derived by mixing the signal from the coherent oscillator 22 and from the stabilized local oscillator 20 in the mixer. Modulator 28 and amplifier 26 are used to modulate the carrier from mixer 24 to provide an output transmit signal to the system antenna. Phase modulation could also be used to increase pulse energy. The local oscillator 20 is self contained and provides the fundamental radar frequency which, following standard procedures, is usually generated using a crystal that provides a precise and accurate reference frequency. The coherent oscillator 22 generates a coherent reference frequency at the direction of the computer 30. Coherent oscillator 22 also provides a synchronization signal to the synthetic signal synthesizer 12. A digital output from the computer 30 is converted to an analog format by the digital to analog converter 32. The analog data is then used by the coherent oscillator 22 to generate the appropriate coherent reference frequency. Generation of the coherent transmit waveform is done in accordance with conventional technology and nothing new is employed.

The computer 30 performs all the functions associated with classical SAR processing. This includes calculating all the necessary information to define each range cell within a footprint based upon data provided by the motion compensator 48. This data defines the spatial position and velocity of the antenna and the direction of antenna boresight. In addition, computer 30 calculates the coefficients for the Taylor expansion about each reference scatterer. These coefficients are used to calculate synthesizing commands which are input to the synthetic signal synthesizer 12, to compute the phase data for input to the rotation matrix 16 (FIG. 2), and to compute the x—y apices of the trapezodial azimuth cells during mapping. The computer 30 uses software to control the invariant mapping processor 14 and controls all timing functions. Timing commands are input to the synthetic signal synthesizer 12 for proper generation of the analog synthetic signals, $I_3$ and $Q_3$.

An incoming signal is received by the antenna and is input to mixer 34 and is mixed with an output signal from the stabilized local oscillator 20. This results in an IF (intermediate frequency) signal which is input to the range relative synchronous detector 36. This IF signal is mixed with the quadrature signals $I_3$ and $Q_3$ from the synthetic signal synthesizer 12 and results in outputs $I_1$ and $Q_1$, which are analog inputs to the Analog to Digital Converters 38 and 40. The synthetic signal is the return signal that would result by adding the return signals from all the reference scatterers (one at the center of each range cell as explained hereinabove). As noted hereinabove, this synthetic signal is generated, with or without the existence of reference scatterers, by the synthetic signal synthesizer 12 under computer control 30. In FIG. 2, phase data from computer 30 is input to the rotation matrix 16. The analog to digital converters, 38 and 40, provide I & Q digital samples that are input to sample and hold network 42 where these samples are held until all the data needed for mapping a footprint have been collected. When the data collection is completed at the end of the observation interval, the data are processed under computer control, one range cell at a time. As in classical SAR, the digital signal processor 44 performs three major functions: windowing, fast fourier transformation, and range and antenna gain compensation. The digital signal processor 44 also defines the FFT index and the reflectivity for each azimuth cell within the range cell being processed and passes this information to the computer circuit 31 dedicated to IM.

Signal Generation and Flow—Signal Synthesis and Synchronous Detection

As shown in FIG. 4 in more detail, the imput to the synthetic signal synthesizer 12 are the I/Q sequences $S_1$ and $S_2$ generated by the computer 30.

The function of the synthetic signal synthesizer 12 is to generate modulated quadrature IF signals, $\sigma_{dk}(t)=I_3$, $\sigma_{qk}(t)=Q_3$, which simulate the quadrature returns of all the reference scatterers in response to the $k^{th}$ transmit pulse. Again, let $\rho_k(t)$ be the IF return signal (output from mixer 34) of the actual scatterers in the footprint in response to the $k^{th}$ pulse. Then, the range relative synchronous detection 36 of $\rho_k(t)$ using $\{\sigma_{dk}(t)=I_3, \sigma_{qk}(t)=Q_3\}$ results into a bipolar video $\{I_1=x_{dk}(t), Q_1=x_{qk}(t)\}$ where most of the doppler bias and range walk is cancelled.

The inputs to the signal synthesizer, sequences $S_1$ and $S_2$, are computed by the computer 30 as follows. For each of the range cell centers $\{c^*(j,0,0), j=1, N_R\}$, the phase and the round trip delay estimates are computed by the computer 30. More precisely $$(t_{k,j})=-w_o\{\tau^*(j)+t_k\tau_1(j)+(t_k^2/2)\tau_{11}(j)\} \quad (34a)$$

$$(t_{k,j})=-w_o\{\tau^*(j)+t_k\tau_1(j)\} \quad (34b)$$

$$\tau_k(t_k,j,0,0)=\tau^*j)+t_k\tau_1(j)+(t_k^2/2)\tau_{11}(j) \quad (34c)$$

$$t_k \Longrightarrow t_{kj}=t_k+\tau_k(t_k,j,0,0)+\delta_{BP} \quad (34d)$$

where equation (34a) is for FIG. 1 and equation (34b) is for FIG. 2. The $k^{th}$ transmitted pulse is center at $t_k$ and has duration $T_p$. The return due to the $j^{th}$ reference scatterer in response to the $k^{th}$ transmitted pulse is wider than the transmitted signal because of finite bandwidth and it is centered at $t_{kj}$, given in equation (34d). In this relation $\delta_{BP}$ denotes the small delay introduced by bandpass filtering. The second step is to compute $N_R$ samples of the phases exactly at grid times; that is at $t=lT_p$ where l is an integer. This is accomplished using the classical technique where a parabolic interpolation is followed by sampling $$\{\psi(t_k,j), t_{kj}, j=1, N_R\} \Longrightarrow \{\psi'(t_k,l), l=1, N_R\} \quad (35)$$

where l stands for $t=lT_p$ and the arrow means parabolic interpolation followed by sampling. Now the two sequences are generated $$\{z_d(k,j)=\cos\psi'(t_k,j)=S_1, z_q(k,j)=\sin\psi'(t_k,j)=S_2 \text{ for } j=1,N_r\} \quad (36)$$

where j is used as dummy index rather than l. The synthetic signal synthesizer 12 in FIGS. 1 and 2 are identical from a hardware point of view, but the inputs, and consequently the outputs, are different.

The mathematical relations implemented by the synthesizer 12 and detector 36 are discussed and shown with reference to FIG. 4. First the sequences $\{z_d(k,j)=S_1, z_q(k,j)=S_2 \text{ for } j=1, N_r\}$ coupled from computer 30 to synthesizer 12 are transformed into analog signals. Typically, this digital to analog conversion can be performed in two steps. In the first step the sequences $\{z_d(k,j), z_q(k,j)\}$ are transformed into two respective trains of amplitude modulated narrow pulses with spacing $T_p$. Standard pulse generation techniques are employed for this purpose. (Amplitude modulation is accomplished using standard modulators as set forth hereinbelow). These trains are represented as $$\{z_d(k,j), j=1,N_r\} = \sum_{j=1}^{N_r} z_d(k,j)\delta(t-jT_p) = S72 \quad (37a)$$

$$\{z_q(k,j), j=1,N_r\} = \sum_{j=1}^{N_r} z_q(k,j)\delta(t-jT_p) = S48 \quad (37b)$$

where the Dirac $\delta$-functions are replaced by narrow pulses (of the order of $T_p/2$). In the second step, the train of amplitude modulated narrow pulses is filtered by a lowpass filter with an impulse response $h_{sys}(t)$ which matches the impulse response of the SAR system $$z_{dk}(t) = \sum_{j=1}^{N_r} z_d(k,j)\delta(t-jT) * h_{sys}(t) = I_4 \quad (38a)$$

$$z_{qk}(t) = \sum_{j=1}^{N_r} z_q(k,j)\delta(t-jT) * h_{sys}(t) = Q_4 \quad (38b)$$

where * is the convolution operator. Finally, the analog lowpass signals $\{z_{dk}(t)=I_4, z_{qk}(t)=Q_4$ are used to modulate two IF quadrature signals $$r(t)\cos\{w_{co}t+\psi(t)\}=z_{dk}(t)\cos w_{co}t-z_{qk}(t)\sin w_{co}t=I_3 \quad (39a)$$

$$r(t)\sin\{w_{co}t+\psi(t)\}=z_{dk}(t)\sin w_{co}t+z_{qk}(t)\cos w_{co}t=Q_3 \quad (39b)$$

where $$r(t) = \sqrt{\{z^2_{dk}(t)+z^2_{qk}(t)\}} \text{ and } \psi(t) = \tan^{-1}\{z_{qk}(t)/z_d(t)\} \quad (39c)$$

Equations (39a) and (39b) represent $\sigma_{dk}(t)$ and $\sigma_{qk}(t)$ given in equations (25a) and (25b). Unity scatterers have been assumed and the routine problem of amplitude scaling was not considered. However, as in the classical digital SAR, proper amplitude scaling is required so that the inputs of the A/D converters remain within the operating dynamic range. Automatic gain control can be used for this scaling purpose as in most radars, but this is neither critical nor necessary to this system. As noted hereinabove, a constant phase error in $\{\sigma_{dk}(t),\sigma_{qk}(t)\}$ is irrelevant since the discrimination is based on doppler. However, synchronous detection of the $k_{th}$ pulse return $\rho_k(t)$ using $\{\sigma_{dk}(t),\sigma_{qk}(t)\}$ requires precise time synchronization of $\rho_k(t),\sigma_{dk}(t),$ and $\sigma_{qk}(t)$. This synchronization relies on computer timing.

The computer 30 (FIG. 1 or FIG. 2) controls all timing because timing is critical to developing an accurate image and timing is crucial to all types of SAR. The computer provides the timing to the impulse generator 50 (FIG. 4) in order to generate an impulse sequence at the correct time. The computer 30 provides synthesizing sequences which enable the modulator to develop a pulse having an output amplitude proportional to the input amplitude.

In the synthesizer 12, shown in FIG. 4, the modulator pulses are an approximation of the Dirac δ-functions equation. There are two synthesizing sequences $S_1$ and $S_2$ for each range cell; each sequence is used to modulate a rectangular pulse in modulators 52 and 54, respectively. This results in two trains of pulses, S72 and S48, for each transmit pulse. Each train of pulses represents equations (37a) and (37b), respectively. In order to obtain the analog quadrature signals $I_4$ and $Q_4$, which are needed to develop the correct synthetic signal, each train of pulses is passed through a low pass filter which has an impulse response matched to the SAR system. Filtering the two pulse trains, S72 and S48, yields $I_4$ and $Q_4$.

The synchronization signal from coherent oscillator 22, $\cos w_{co}t$, is input directly into mixers 56 and 58 for heterodyning with $I_4$ and $Q_4$, respectively. When the synchronization signal is heterodyned with the signal, $I_4$, the result is $z_{dk}(t)\cos w_{co}t$, $I_5$, which is the first term in equation (39.a). When the synchronization signal is heterodyned with $Q_4$, the result is $z_{qk}(t)\cos w_{co}t$, $Q_5$, which is the second term in equation (39.b). To obtain the remaining terms in these equations, the synchronization signal is passed through a 270 degree phase shifter 60 to yield $\sin w_{co}t$, $Q_6$. When $Q_6$ is heterodyned in mixer 62 with $I_4$, the result is $z_{dk}(t)\sin w_{co}t$, $Q_7$, which is the remaining term in equation (39.b) $Q_6$ is also passed through an 180 degree phase shifter 64 to obtain $-\sin w_{co}t$, $Q_8$, when $Q_8$ is heterodyned in a mixer 66 with $Q_4$, the result is $-z_{qk}(t)\sin w_{co}t$, $I_6$, which is the remaining term in the equation (39a). Each of $I_5, I_6, Q_5,$ and $Q_7$ are bandpass filtered respectively in filters 68A, 68B, 68C, and 68D to maintain their signal quality. $I_5$ and $I_6$ are then summed in the adder 70 to yield the inphase component $I_3$ of the synthetic signal. Similarly, $Q_5$ and $Q_7$ are summed in the adder 72 to yield the quadrature component $Q_3$ of the synthetic signal. Synchronous detection of the IF signal from mixer 34 now takes place in the synchronous detector 36 as set forth hereinabove.

Signal Generation and Flow—Invariant Mapping

The digital signal processor 44 partitions each range cell of the footprint print into doppler cells and the output of the digital signal processor 44 can be displayed as a map of reflectivity versus range and doppler. On the basis of peak amplitude, this may be adequate for automatic detection of candidate targets within a footprint. In general, however, the detection based on a single footprint may result in excessive false alarms; hence, more information is needed for reliable discrimination between targets and clutter. Optimum accumulation of the information from the footprints onto an absolute x—y map, which is called imaging, can greatly improve detection/discrimination performance. Invariant mapping (IM) is used to transfer and to accumulate the information of each trapezoidal azimuth cell in a sequence of footprints onto an absolute x—y map. This image in x—y coordinates allows elimination of many false alarms, using conventional imaging techniques. The classical SAR will produce a similar image for a linear horizontal trajectory with constant velocity. The IM in conjunction with RRDP extends the application of SAR to nonlinear geometries. For example, the azimuth resolution of a seeker in a downward trajectory was limited by the beamwidth. Now, the seeker azimuth resolution is significantly increased by performing RRDP/IM.

IM involves three circuit blocks shown in FIGS. 1 and 2— digital signal processor 44, invariant mapping processor 14, and computer 30. The interactions between the three circuits is shown in more detail in FIG. 5. As stated earlier, the computer 30 has two sections—one section for general computation and one section, 31, dedicated to invariant mapping. The overlap processor 52 is a special purpose computer which is used to compute the areas of overlap between a trapezoidal azimuth cell and the rectangular cells of the x—y grid. To describe IM with reference to FIG. 6, assume that one azimuth cell at a time is processed. For a real time implementation, IM will process several cells simultaneously.

As mentioned previously, the mapping of each trapezoidal azimuth cell consists of five operations—(1) computation by the computer 30 of the trapezoidal apices and of the reflectivity density of the trapezoidal cell, (2) definition of the smallest rectangular window in the x—y grid which contains the trapezoidal cell, also by the computer 30, (3) computation of the areas of overlap between the trapezoidal cell and each of the rectangular cells within the window by the invariant mapping processor 14, (4) computation by the computer 30 of the product of the reflectivity density of the trapezoidal cell by the area of overlap for each rectangular cell in the window, and (5) accumulation of the areas of overlap and of the products in two absolute arrays. This five step procedure is repeated until all the trapezoidal azimuth cells have been mapped. In the digital signal processor 44, the trapezoidal cells of FIG. 6 are defined in terms of range index m and FFT index n (doppler). Thus the trapezoidal cells are denoted as $$\{TRAP(m,n) \text{ for m and n over footprint}\}. \tag{40}$$

The four apices of the trapezoidal cells are denoted as $$\{P1(m,n), P2(m.n), P3(m,n), P4(m,n), \text{ for all } m,n\} \tag{41}$$

where P1, P2, P3 and P4 are in a counterclockwise rotation starting for P1 at minimum range and maximum doppler. The computer 30 knows the positions of $\{P1(m,n), P2(m,n), P3(m,n), P4(m,n)\}$ in range and doppler and it computes the corresponding x—y coordinates $$\{XP1(m,n), YP1(m,n), XP2(m,n), YP2(m,n), XP3(m,n), YP3(m,n), XP4(m,n), YP4(m,n)\}. \tag{42}$$

The center, point D in FIG. 6, of TRAP(m,n) is defined by its slant range and doppler frequency $\{r(m,n), F(m,n)\}$. The points, $D_1$ and $D_2$, in FIG. 6 have the same median range $r(m,n)$ and doppler frequencies $\{freq(D1)=(f(m,n)-\Delta f/2), freq(D2)=(f(m,n)+\Delta f/2)\}$, respectively. The doppler frequency at the median range can be computed in terms of the relative azimuth angle $\mu$ and of the Taylor coefficients of the expansion about the center range of the cell, as shown in equation (32). The computer 30 uses the inverse of this formula to compute $\mu(D_1)$ and $\mu(D_2)$. FIG. 6 shows that $$\mu(P_1)=\mu(P_4)=\mu(D_2), \text{ and } \mu(P_2)=\mu(P_3)=\mu(D_1) \tag{43a}$$

$$r(P_1)=r(P_2)=r(m,n)-\Delta R/2, \text{ and } r(P_3)=r(P_4)=r(m,n)+\Delta R/2, \tag{43b}$$

where the slant ranges are measured from the antenna position at central time as indicated by FIG. 7. Once a point is defined in terms of range and relative azimuth, the computer 30 calculates the corresponding absolute x—y coordinates to define all the components of the set in equation (42). In this fashion all the x—y coordinates of all the trapezoid apices are computed prior to starting signal processing for a footprint. Within the computer 30, the computation is simplified by making use of the following relations:

$$P1(m,n)=P4(m-1,n)=P2(m,n+1) \tag{44a}$$

$$P2(m,n)=P3(m-1,n)=P1(m,n-1) \tag{44b}$$

Figure 8:
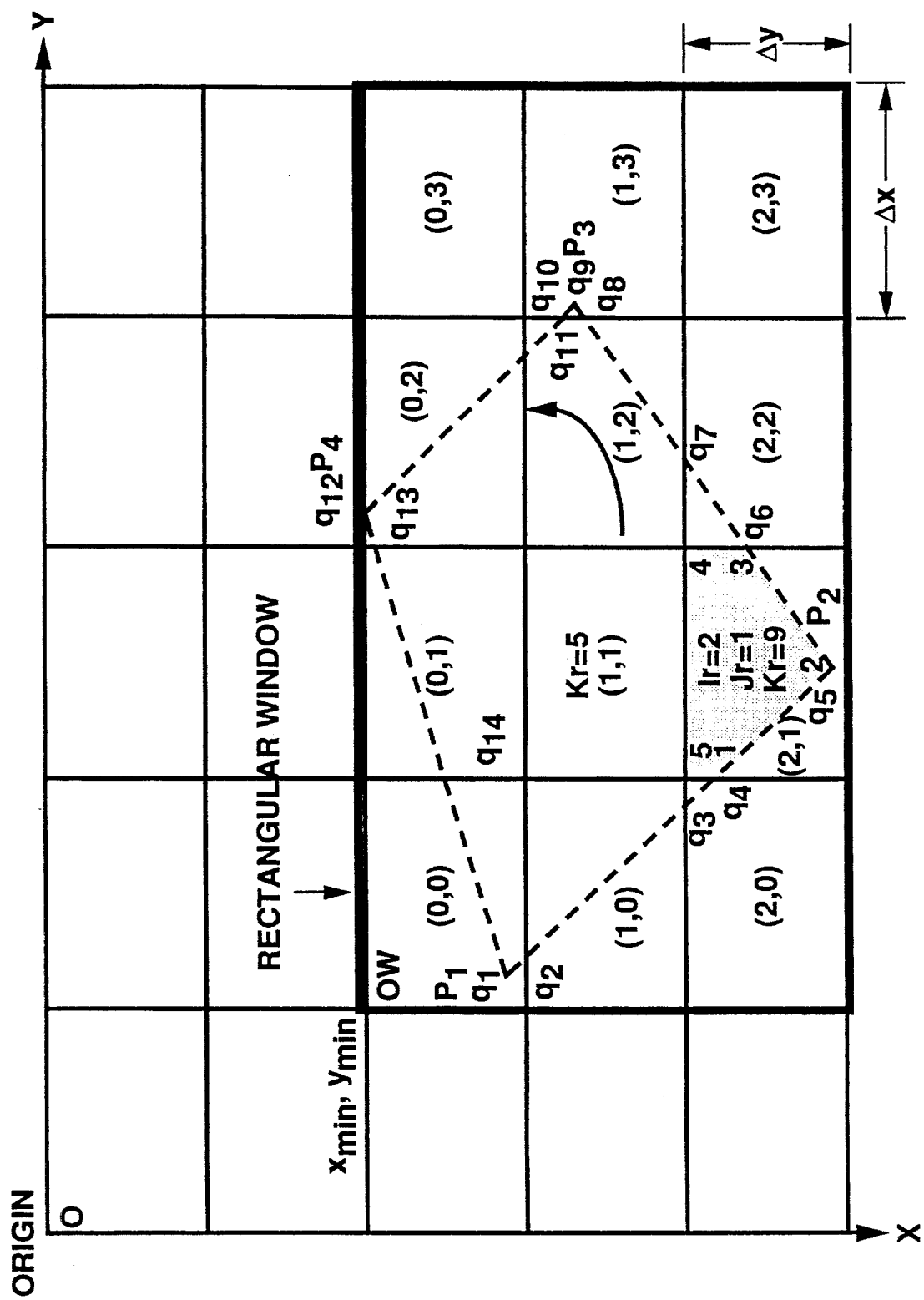
FIG. 8 shows an x—y grid rectangle enclosing a convex polygon of a trapezoidal azimuth cell within a rectangular window.

Consider now the mapping of a single trapezoidal azimuth cell denoted as TRAP(m,n) as illustrated in FIG. 8. FIG. 8 shows the absolute x—y grid with origin O, and a rectangular window with origin OW which contains the trapezoidal cell being mapped. Details are shown for identifying overlaps between the trapezoidal cell and the rectangular cells in the window. The coordinates of OW are $$XOW=IIMN(\Delta x), YOW=JJMN(\Delta y) \tag{45}$$

where the indices $\{IIMN, JJMN\}$ define the absolute location of the minimum corner of the window, OW. The indices within the window are defined relative to the minimum corner OW. The counterclockwise contour $\{P1, P2,P3,P4\}$ is partitioned to include all the intersects with the x—y grid. This yields a counterclockwise contour $\{q_i, i=1, N_q\}$, where $N_q=14$ in FIG. 8. The computation of the areas of overlap for a particular rectangular cell is based on a local counterclockwise contour for that rectangular cell. Such a local contour is shown in FIG. 8 for the rectangle with relative indices ir=2, jr=1; this local contour defines a convex polygon with apices numbered $\{1,2,3,4,5\}$. Since the x—y coordinates of the convex polygon are known, either from the set of q's or as an interior corner, the area of the convex polygon (overlap) can be computed. The digital signal processor 44 provides the necessary information to the computer 30 which shares it with the overlap processor 52 (FIG. 5) and wherein m=range index, n=FFT index, and Cross(m,n)=normalized cross section for that cell. The absolute x—y coordinates of the four apices were defined in equation (42). In equation (46)

$$\{XP1, YP1, XP2, YP2, XP3, YP3, XP4, YP4\} \tag{46}$$

the indices (m,n) have been dropped because a single trapezoidal cell is being considered. As indicated earlier, the mapping of one trapezoidal azimuth cell consists of five operations: (1) computation of the x—y coordinates of the trapezoid apices and of the reflectivity density of the trapezoidal cell, (2) definition of the smallest rectangular window which contains the trapezoidal cell, (3) computation of the areas of overlap between the trapezoidal cell and each rectangular cell within the window, (4) computation of the product of the reflectivity density by the area of overlap for each rectangular cell in the window, and (5) accumulation for each rectangular cell in the window of the areas of overlap and of the reflectivity products. These five operations are performed by the computer 30, except for the computation of the areas of overlap in the window which is accomplished by the overlap processor 52. The block diagram of FIG. 8 shows this sequence of operations. A simple external function AREA is used to compute the area of a convex polygon. It is based on partitioning the polygon into adjacent triangles and summing the areas of the triangles. This function is used to compute the area of the entire trapezoid as well as the overlap areas for the rectangular cells in the window. This completes the first operation.

The computation of the x—y coordinates of the four trapezoid apices (set (46)) has already been explained. The reflectivity density of the trapezoidal cell is given by $$\rho=Cross(m,n)/AREA(P1,P2,P3,P4) \tag{47}$$

where Cross(m,n) comes from the digital signal processor 44 and the denominator is the area of the trapezoid.

The second operation defines the smallest rectangular window containing the trapezoidal cell. The length and width of each rectangle, $\Delta x$ and $\Delta y$, are the x and y increments of the absolute x—y map. The position of the minimum corner of the smallest rectangular window (OW in FIG. 8) enclosing the trapezoidal cell is defined by the two integers, IIMN, JJMN, in the absolute x—y grid where $$IIMN=INT\{MIN(XP1,XP2,XP3,XP4)/\Delta x\} \text{ and} \tag{48a}$$

$$JJMN=INT\{MIN(YP1,YP2,YP3,YP4)/\Delta y\}, \tag{48b}$$

wherein MIN means "minimum of set" and INT means "integer part of". For FIG. 8 IIMN=2 and JJMN=2. The corresponding absolute x—y coordinate for this minimum corner OW are $$XMN=(IIMN)\Delta x \tag{49a}$$

$$YMN=(JJMN)\Delta y \tag{49b}$$

The size of the window $\{SIZWX, SIZWY\}$ is defined as an integer number of $\Delta x$ and $\Delta y$, and $$SIZWX=MAX\{XP1-XMN,XP2-XMN,XP3-XMN,XP4-XMN\} \tag{50a}$$

$$SIZWY=MAX\{YP1-YMN, YP2-YMN, YP3-YMN, YP4-YMN\} \quad (50b)$$

$$NWI=INT\{SIZWX/\Delta x\}+1=\text{number of rows} \quad (50c)$$

$$NWJ=INT\{SIXWY/\Delta y\}+1=\text{number of columns} \quad (50d)$$

where MAX means "maximum of set". By definition, the two-dimensional indices of a rectangular cell are the indices of the minimum corner in the rectangle. In the rectangular window shown in FIG. 8, there are 12 rectangles (3 rows with four columns in each row) with indices $$(ir,jr) \text{ for } ir=0, NWI-1 \text{ and } jr=0, NWJ-1 \quad (51)$$

where NWI=3 and NWJ=4. The respective indices, ir,jr, for each rectangle in FIG. 8 are shown in brackets within each rectangle. It is convenient to define the window with a one-dimensional index kr which corresponds to reading the rows consecutively. Thus, $$kr=NWJ\times ir+jr \text{ and} \quad (52a)$$

$$krmx=NWJ\times(NWI-1)+(NWJ-1) \quad (52b)$$

where krmx is the maximum value of kr and kr runs from 0 to krmx. For example, the rectangle indices {ir=2, jr=1} become a single index kr=9 in FIG. 8, because NWJ=4. Conversely, given kr and NWJ, the {ir,jr} are easily computed. Consider a point p in the window, the integer function INDXKR(p) can be used to compute the index of the rectangle which contains the point p $$kr = INDXKR(p) \quad (53a)$$
$$= NWJ \times INT\{(X(p) - XMN)/\Delta x\} + \quad (53b)$$
$$INT\{(Y(p) - YMN)/\Delta y\}$$

where X(p) and Y(p) denote the absolute x—y coordinates of p. For example, $q_5$ in FIG. 8 has window x—y coordinates {2.9$\Delta x$, 1.5$\Delta y$}. Thus, it belongs to the rectangle with single index kr=9. The relative two-dimensional indices (ir, jr) for the rectangle are easily obtained $$ir=INT\{kr/NWJ\} \quad (54a)$$

$$jr=kr-ir\times NWJ. \quad (54b)$$

Using the same example kr=9 yields {ir=2, jr=1}. The corresponding absolute indices for the rectangle are $$iir=ir+IIMN \quad (55a)$$

$$jjr=jr+JJMN \quad (55b)$$

The third operation, computation of areas of overlap in the window, is performed by the overlap processor 52. The sequential computation of the areas of overlap (one rectangular cell after the other) would be too slow. In view of a real time implementation, a fast overlap algorithm was developed to simultaneously compute all the areas of overlap in the window. The overlap processor 52 is a special purpose computer under the control of the computer 30. The outputs of the overlap mapping processor 52, which are inputs to the computer 30, are as follows:

$$NOVL = \text{number of rectangles which overlap the} \quad (56b)$$
$$\text{trapezoidal cell, } \{IR(n), JR(n) \text{ for } n = 1, \text{ and } NOVL\} =$$
$$\text{arrays defining the relative indices of overlapping rectangles.}$$

$$\{OVL(n) \text{ for } n = 1, \text{ and } NOVL\} = \quad (56c)$$
$$\text{array containing overlap areas.}$$

For example in FIG. 8 NOVL=10. The steps of the overlap algorithm are:

(a) Check the size of the rectangular window and exit if the window is of size {1,1}, i.e., NWI=NWJ=1. A window of size {1,1} means that the trapezoid is entirely contained in the only rectangle in the window. The outputs of the overlap processor 52 are $$NOVL=1, \quad (57a)$$

$$IR(1)=JR(1)=0, \text{ and} \quad (57b)$$

$$OVL(1)=\text{Area of trapezoid}. \quad (57c)$$

(b) Following the counterclockwise contour around the trapezoid (P1,P2,P3,P4), list all the intersect points with the x—y grid, in order of appearance. Insert in that counterclockwise list the apices, P1,P2,P3,P4, if they are not already included. This merged counterclockwise list will be denoted as $$q(l)=q_l \text{ for } l=1,N_q \quad (58)$$

where $N_q \geq 4$ and the set is cyclic with period $N_q$. Cyclic means that q(1) follows q($N_q$). In FIG. 8, $N_q$=14 and $q_{14}=q_o$, where $q_l$ is the same as q(l).

(c) Consider one point q(l) on the cyclic contour given by equation (58). In general this point belongs to two different rectangles with indices {kqe(l), kqb(l)}. The first rectangle is defined by the segment {q(l-1),q(l)} ending on q(l). The second rectangle is defined by the segment {q(l), q(l+1)} starting at q(l). The two indices {kre(l),krb(l)} are computed using equation (53a)

$$kre(l)=INDXKR\{pe=(q(l-1)+q(l))/2\} \quad (59a)$$

$$krb(l)=INDXKR\{pb=(q(l)+q(l+1))/2\} \quad (59b)$$

where pe and pb are the median points for the segments {q(l-1),q(l)} and {q(l),q(l+1)}, respectively. For example, $q_4$ in FIG. 8 belongs to two rectangles defined by kre(4)=8, and krb(4)=9. Note that if q(l) happens to be an apex of the trapezoid and is interior to a rectangle; then, kre(l)=krb(l). This is because the three points q(l-1),q(l),q(l+1) belong to the same rectangle. For example, the point $q_6$ belongs to one rectangle defined by kre(6)=krb(6)=9. Using equations (59a) and (59b), one defines two arrays $$\{kre(l), krb(l) \text{ for } l=1, N_q\}. \quad (60)$$

Then, a point q(l) on the trapezoid contour belongs to the rectangles with indices kre(l) and krb(l). The list of the indices defining the rectangles which have a partial overlap with the trapezoid is denoted as $$\{kr(k) \text{ for } k=1, N_k\} \quad (61)$$

This list is obtained by merging the arrays kre(l) and krb(l), ordering them in increasing value, and eliminating redundant data. For the example in FIG. 8 one obtains {kr(k)}= {0,1,2,4,6,7,8,9,10} and $N_k$=9.

(d) A window grid point is defined as the intersection of two grid lines within the rectangular window. FIG. 8 discloses 20 window grid points (4 rows of 5 columns). All points of the rectangular window grid are checked with respect to the trapezoid and define a matrix $$c(i,j) \text{ for } i=0, NWI-1 \text{ and } j=0, NWJ-1$$

$$c(i,j)=1 \text{ for interior corner, and}$$

$$c(i,j)=0 \text{ elsewhere,}$$

where an interior corner is a window grid point which is inside the trapezoid. In the example of FIG. 8, there are four interior corners—$c(1,1), c(1,2), c(2,1) c(2,2)$.

(e) There are exactly $N_k$ rectangles which have partial overlap with the trapezoid. The indices for the rectangles are in the array $kr(n)$ computed in step (c). For those rectangles the three output arrays are computed $$IR(n), JR(n), OVL(n) \text{ for } n=1, N_k. \tag{63}$$

For each n, $IR(n)$ and $JR(n)$ are computed from $kr(n)$ using equation (54) such that $$IR(n) = INT\{kr(n)/NWJ\} \text{ and} \tag{64a}$$

$$JR(n) = kr(n) - IR(n) \times NWJ. \tag{64b}$$

To compute the overlap area for the particular rectangle $kr(n)$ with relative indices $\{ir=IR(n), jr=JR(n)\}$, all the $q(l)$'s on the contour (or interior) to this rectangle are listed. Then, the corners of the rectangle that are interior to the trapezoid are added to the list. Finally, the list is merged so that the points are ordered on a local counterclockwise contour. This local contour defines a convex polygon whose area is easily obtained using the external function AREA defined earlier. In FIG. 8, the convex polygon within the rectangle defined by $kr=9$ or $\{ir=2, jr=1\}$ is shown as a shaded area and the apices are numbered 1 through 5 in a counterclockwise order. The overlap area of the convex polygon is stored in $OVL(n)$. In the unsorted local list the selected $q(l)$'s are those for which $$kre(l)=kr(n) \text{ and/or } krb(l)=kr(n)$$

and the selected corners are those for which $$ir \leq i \leq ir+1$$

$$jr \leq j \leq jr+1$$

$$c(i,j)=1.$$

In rectangle $kr=9$, the selected interior corners are $c(2,1)$ and $c(2,2)$ which are points 4 and 5 on the polygon contour.

(f) In this step, the rectangles which lie entirely within the trapezoid contour (full overlap) are included. This is done as follows. The window is scanned to list each rectangular cell $\{kr=0, krmx\}$, where $krmx$ is given in equation (52b). For each kr, the indices $\{i=ir, j=jr\}$ for the minimum corner of the rectangle $kr$ are computed using equations (54a) and (54b) and the following relations are checked:

$$c(i,j)=1,$$

$$c(i+1,j)=1,$$

$$c(i,j+1)=1, \text{ and}$$

$$c(i+1,j+1)=1.$$

If all the relations are satisfied (4 interior corners), this means that the rectangle with relative indices $\{ir=1, jr=1\}$ has full overlap. This information must be added to the outputs:

$$n=n+1$$

$$IR(n)=i$$

$$JR(n)=j$$

$$OVL(n)=\Delta X_x (\Delta y).$$

When the scanning of $c(i,j)$ is completed the final value of n is NOVL and the overlap processor 52 has completed its work for the trapezoidal cell. In FIG. 8, only one rectangle, $kr=5$ or $\{ir=1, jr=1\}$, is seen to be entirely within the trapezoid. Thus $NOVL=N_k+1=10$, $IR(10)=1$, and $JR(10)=1$.

The fourth operation is performed by the computer 30 in two steps:

(a) The outputs of the overlap processor 52 are read into the computer, and (b) The product of the reflectivity density (see equation (47)) by the areas of overlap is computed for all the rectangles involved and stored in an array:

$$\{POVL(n)=\rho \times OVL(n) \text{ for } n=1, NOVL\}.$$

The trapezoid information is now stored on four arrays:

$$\{IR(n), JR(n), OVL(n), POVL(n) \text{ for } n=1, NOVL\}.$$

The purpose for the fifth and last operation, which is performed in the computer 30, is to accumulate the information contained in the arrays $\{OVL(n)\}$ and $\{POVL(n)\}$ on two absolute arrays whose dimensions match those of the final absolute map:

$$\{ACOVL(ii,jj) \text{ for } ii=0, IIMAP-1 \text{ and } jj=0, JJMAP-1\} \tag{72a}$$

$$ACPOVL(ii,jj) \text{ for } ii=0, IIMAP-1 \text{ and } jj=0, JJMAP-1\} \tag{72b}$$

where IIMAP and JJMAP are the dimensions of the desired absolute map. The updating of ACOVL and ACPOVL is performed only for the NOVL rectangles which have partial or complete overlap with the trapezoid. It is done as follows:

for $n=1, NOVL$ $ii=IR(n)+IIMN$ $jj=JR(n)+JJMN$ $ACOVL(ii,jj)=ACOVL(ii,jj)+OVL(n)$ $ACPOVL(ii,jj)=ACPOVL(ii,jj)+POVL(n)$ This accumulation completes the mapping of one trapezoidal cell.

Figure 9:
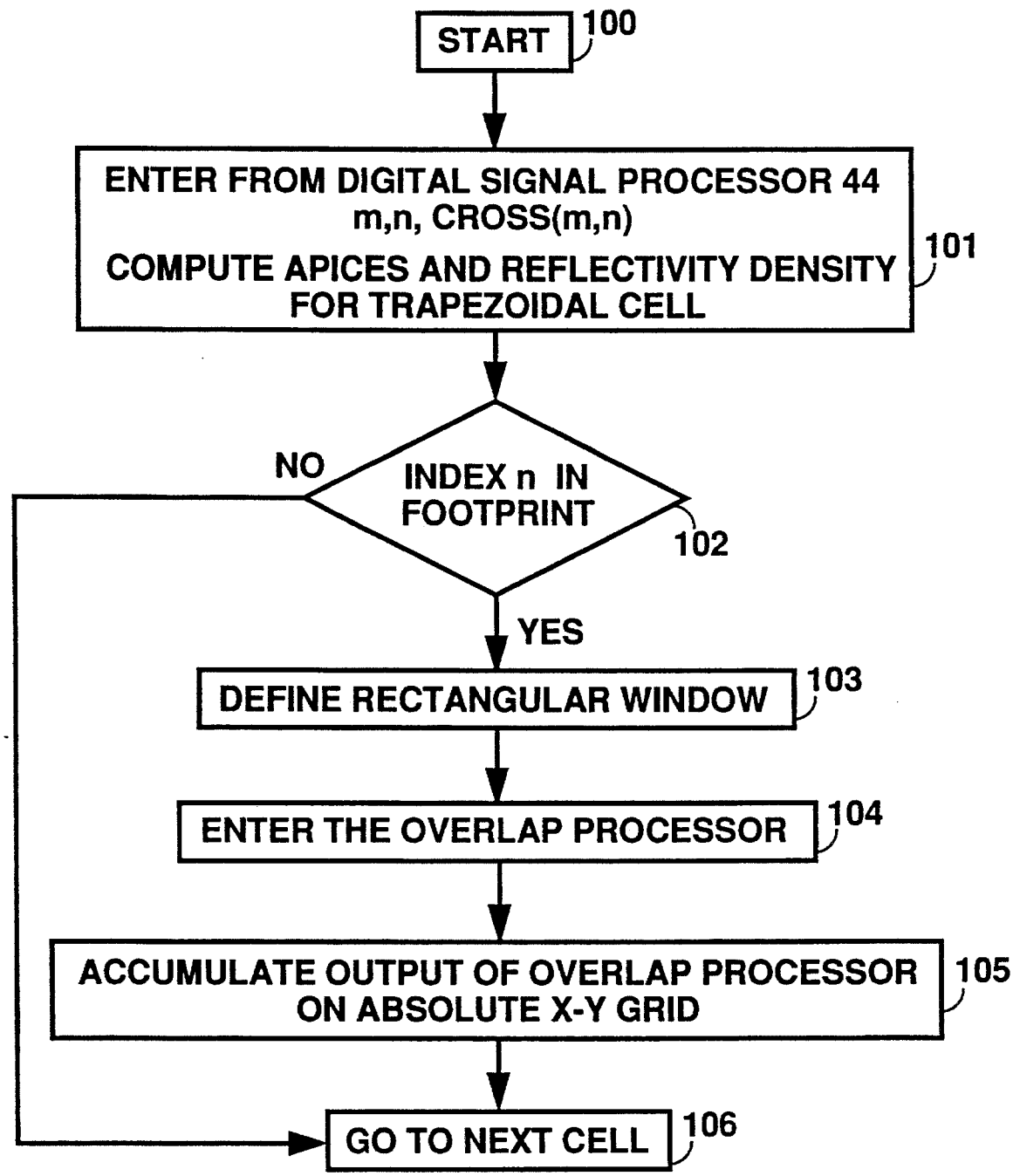
FIG. 9 is a flow diagram for mapping one trapezoidal azimuth cell.

FIG. 9 is a flow diagram for the mapping of one trapezoidal cell by the section of computer 30 dedicated to IM. Box 100 indicates entering or starting the program. The inputs required for the mapping of one trapezoidal cell are, as in the classical SAR, the indices: $\{m=\text{range index}, n=\text{FFT index}\}$ and the normalized cross section, Cross(m,n), as shown in box 101. These are read by the computer from the digital signal processor 44. All the apices for the trapezoidal cells in the footprint have been previously computed and stored in memory. Now, the four apices are read for cell indices (m,n). Also, the reflectivity density is computed using equation (47). In block 102, the test is whether or not n is within the footprint (usually the 3 dB footprint). In block 103, all the parameters defining the minimum window which contains the trapezoidal cell are computed if the index n is within the footprint. In block 104 the overlap processor 52 is used to compute the desired outputs: NVOL, $\{IR\}$, $\{JR\}$, $\{OVL\}$. The operation of the overlap processor is described hereinbelow. Block 105 represents 3 operations (1) computation of the reflectivity products (equation (70)), (2) accumulation of the areas of overlap (equation (72a)), and (3) accumulation of the products (equation 72b)). In block 106 the mapping of the (m,n)th trapezoidal cell is completed, the computer 30 is ready to repeat the procedure on the next trapezoidal azimuth cell.

Figure 10:
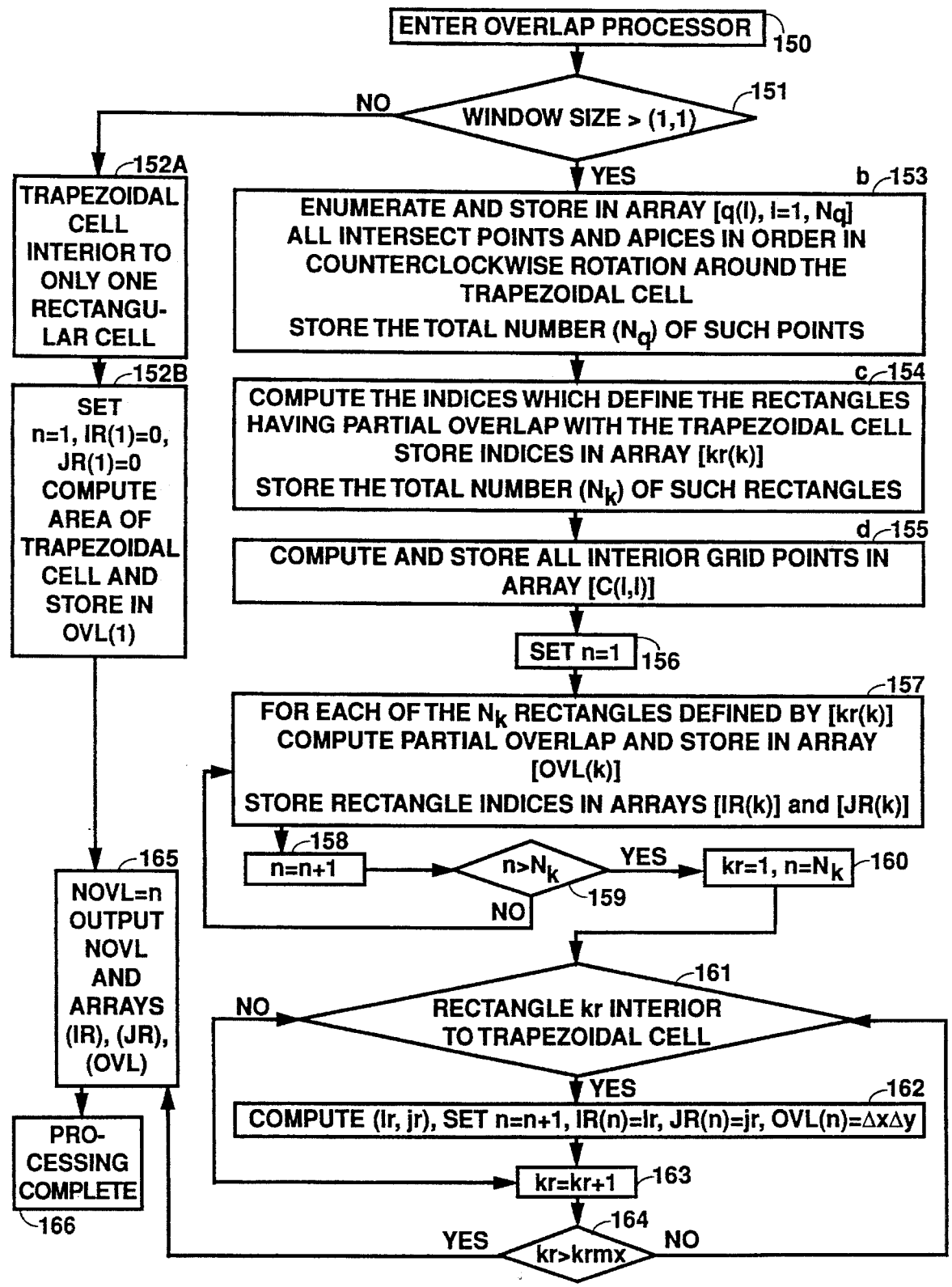
FIG. 10 is a flow diagram for an overlap processor algorithm.

FIG. 10 is a flow diagram which represents the algorithm implemented in the overlap processor 52 to compute the overlap areas of the trapezoidal cell with each rectangular cell within the window. The flow diagram is the same as that for the third operation presented earlier and is performed by overlap processor 52: (1) if the window is of size {1,1} then follow step (a) and exit, and (2) otherwise implement steps (b) through (f). All the necessary equations have been listed. More precisely, in FIG. 10, the correspondence between each block and the function that takes place in processor 52 is as follows:

| BLOCK | FUNCTION |
| --- | --- |
| 152B | equation (57) |
| 153 | equation (58) |
| 154 | equation (61) |
| 155 | equation (62) |
| 157 | equations (63) and (64) |
| 161 | equation (67) |
| 162 | equation (68) |
| 164 | equation (52b). |

Blocks 151, 152A, 156, 158, 159,160 and 163 describe routine comparison function that occurs during the process of computing the overlap areas. In the last block 166, the overlap processor signals to the computer that the processing of the trapezoidal cell is completed. Then the computer 30 reads: NOVL, IR, JR, and OVL, where {.} denote arrays as before.

The five step operation described above is repeated until all the trapezoidal cells in the footprint or in a sequence of footprints have been mapped. Only those trapezoidal cells which are within the footprint need to be mapped.

When the mapping of the last trapezoidal azimuth cell in the last footprint has been completed, the computer 30 can compute the reflectivity map $$\text{for ii=0,IIMAP-1 and jj=0,JJMAP-1} \quad (75a)$$

$$\text{Ref(ii,jj)=ACPOVL(ii,jj)/ACOVL(ii,jj)}. \quad (75b)$$

This reflectivity map can be used for automatic detection/discrimination and/or can be displayed on a monitor. While IM was developed to allow mapping of SAR data for nonlinear geometries, it can also be used in any application where information needs to be mapped or merged. One typical application is sensor fusion of sensor data, for example, merging a passive infrared image with a radar image.

Figure 11:
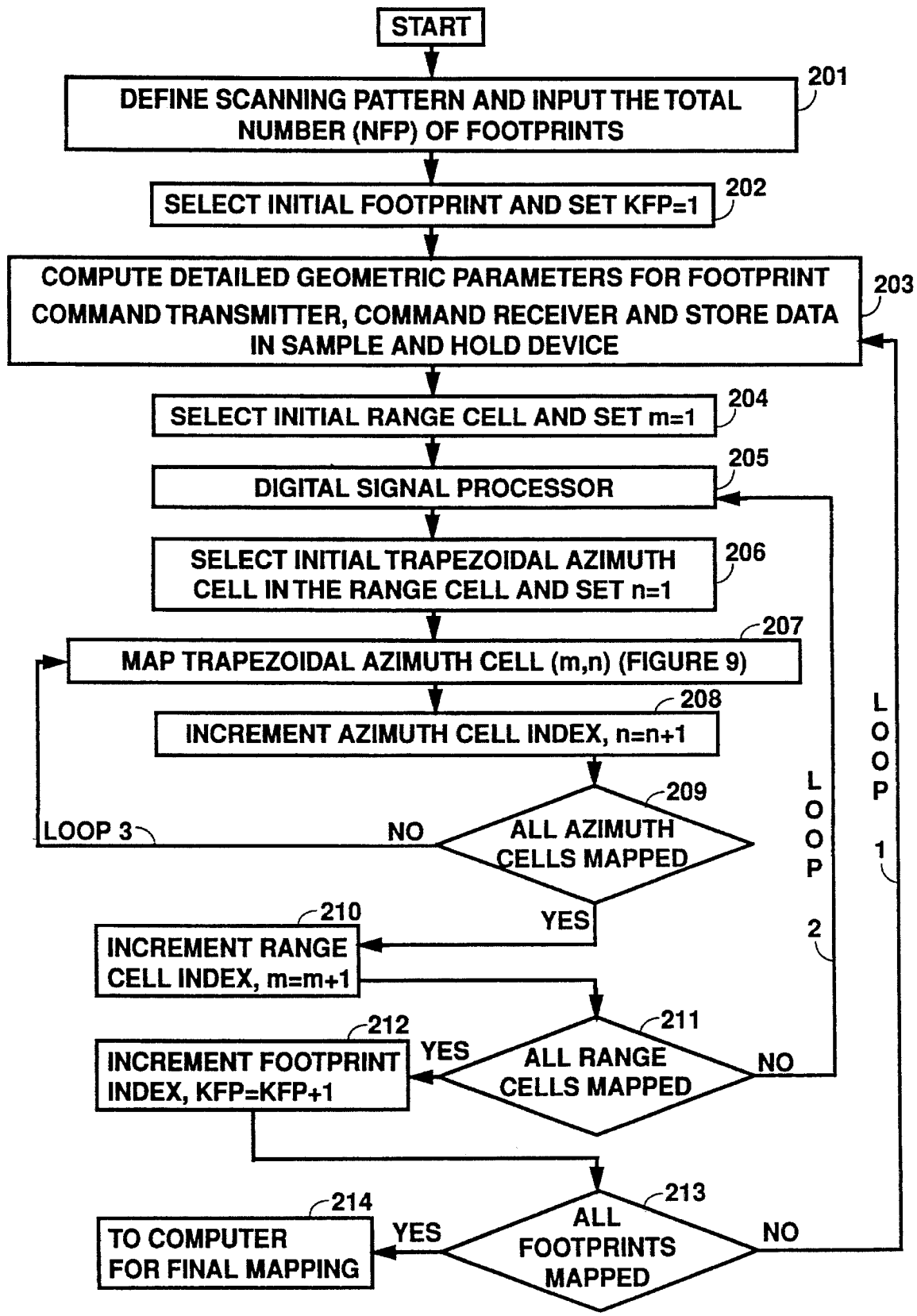
FIG. 11 is a diagram showing the sequencing of footprints.

FIG. 11 shows the flow diagram for the mapping of a sequence of footprints. All the trapezoidal azimuth cells are mapped sequentially, where the mapping of a single trapezoidal azimuth cell follows the flow diagram of FIG. 9. Block 201 implements the definition of the scanning pattern for the NFP footprints being mapped. This includes for each footprint: (1) the position and velocity of the antenna at central time, and (2) the center of the footprint at central time. The scanning pattern is arbitrary instead of being limited to strip or spot mode as in classical SAR. Then, the footprints are processed sequentially until all the NFP footprints have been processed. This is accomplished using loop 1 with initialization in block 202 and testing in block 213. Block 203 shows how the information within the KFPth footprint is accumulated in the sample and hold device 42. The intermediate steps for computer 30 are: (1) computation of detailed information for the footprint, (2) command to transmit which is given to modulator 28, (3) synthesizing commands to the synthetic signal synthesizer 12, and (4) timing commands as indicated in FIGS. 1 and 2. The range cells in the KFPth footprint are processed sequentially, using the data stored in the sample and hold device 42, until all have been processed. This is accomplished using the path of loop 2 with initialization in block 204 and testing in block 211. Block 205 corresponds to the digital signal processor 44, FIGS. 1 and 2, whose operation has already been described. For the selected range cell, the trapezoidal azimuth cells are processed sequentially until all have been processed. This is accomplished using the path of loop 3 with initialization in block 206 and testing in block 209. The processing of one trapezoidal cell has been described with reference to FIG. 9 and takes place in block 207. Blocks 208, 210, and 212 increment from one azimuth cell, range cell, and footprint cell, respectively, to the subsequent azimuth cell, range cell and footprint cell until all cells have been done. Blocks 209, 211, and 213 are the tests for ending loops 3,2, and 1, respectively. When all the trapezoidal azimuth cells in all the range cells of all the footprints have been processed (completion of the three loops), the reflectivity map is generated by the computer 30 following equation (75). This takes place in block 214. Such a map can be used for automatic detection/discrimination and/or displayed on a monitor, as for the classical SAR.

While a preferred embodiment of the synthetic apertaure system is shown in a radar application, the combination of range relative doppler processing and invariant mapping allows greatly imposed imaging capability for nonlinear trajectories or other variable velocities. The system is readily adaptable with all systems within the electromagnetic spectrum such as acoustic, infrared, sonar, radar and doppler beam sharpening.

Additionally, new synthetic aperture radar applications include intrusion detection, circular trajectories and nonlinear trajectories. Obviously many modifications and variation of the present invention are possible in the light of the above teachings. It is therefore to be understood that within the scope of the appended claims the invention may be practiced otherwise than as specifically described.

The use of a reference scatterer and accurate range and doppler information to provide synthetic aperture mapping is useful accross the electromagnetic energy spectrum. Typically, in doppler radar it improves doppler resolution even in nonlinear geometry synthetic signals and allows range relative doppler processing synchronous detection. In synthetic aperture radar, doppler resolution is improved and invariant mapping can be done.

APPENDIX A

Computation of Taylor Coefficients

1. Introduction

Figure 12:
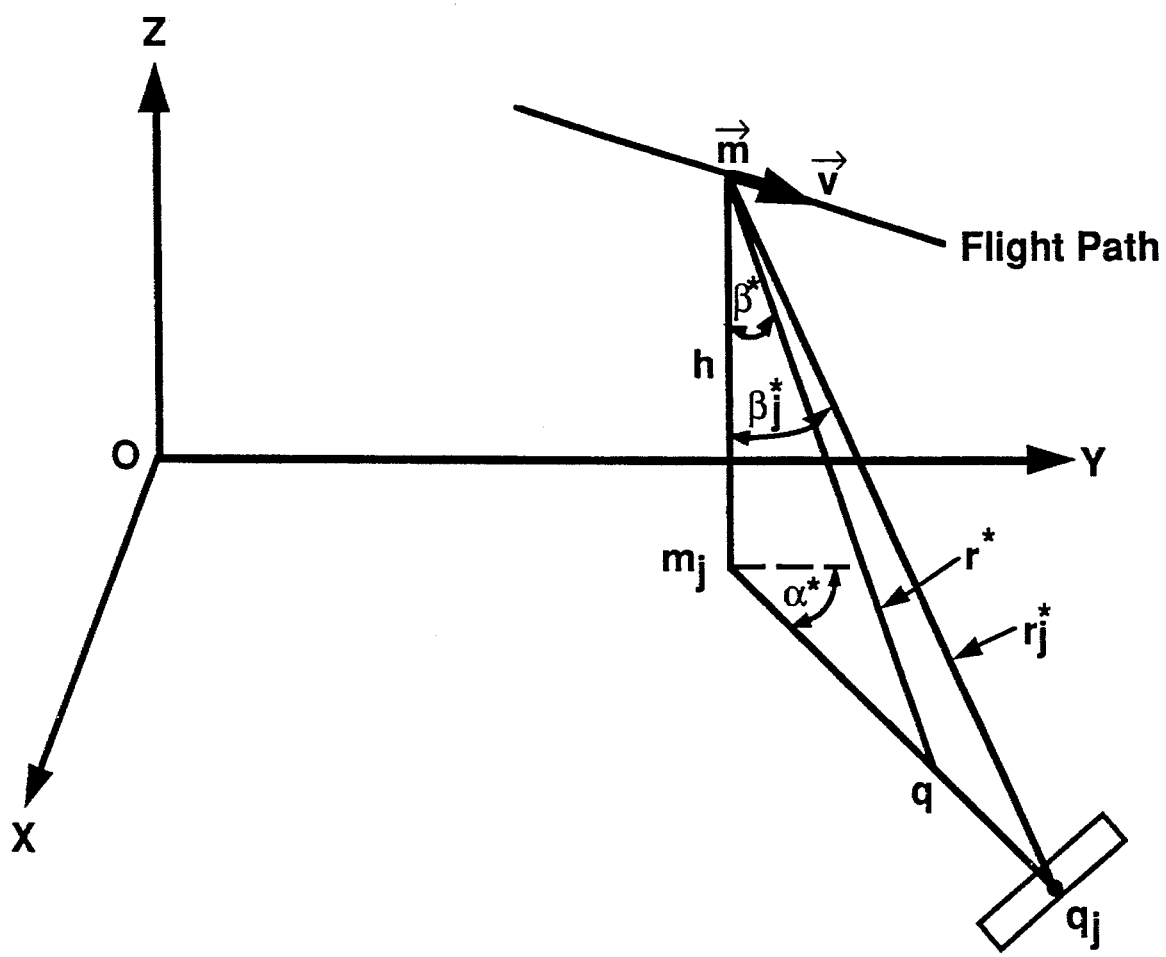
FIG. 12 is a single line drawing depicting a forward looking SAR in a downward trajectory.

The computation of the Taylor coefficients which are needed for Range Relative Doppler Processing (RRDP) and for the Invariant Mapping technique (IM) are explained herein. FIG. 12 depicts a forward looking SAR in a downward trajectory. While this geometry corresponds to an useful application, the choice of the trajectory is unrestricted. Indeed, RRDP/IM has also been applied, in a piecewise fashion, to circular trajectories. This appendix contains two sections. The first section defines the primary parameters which are needed to specify the antenna and the footprint at central time. From the primary parameters, all the relevant footprint informaiton is computed. The second section gives precise formulas for the dominant Taylor series coefficients.

It is noted that all the antenna and footprint information and all the Taylor coefficients must be precomputed just prior to the start of the corresponding observation interval. As for the classical SAR, the range resolution is inversely proportional to the system bandwidth and doppler resolution is inversely proportional to the duration of the observation interval.

2. Antenna and Footprint Information

The absolute ground coordinates are {OX,OY,OZ} and the points m and q denote, respectively, the position of the antenna and of the center of the footprint at central time. The point m can be defined by its absolute X—Y—Z coordinates $$\overrightarrow{Om} = \{m_x, m_y, h = m_z\}; \quad (A.1)$$

this information is used in IM.

It is convenient to define RRDP in spherical coordinates centered on the fixed point m, where the azimuth $\alpha$ is with respect to OY and the elevation angle $\beta$ is measured off the downward vertical. The spherical coordinates of the vector $\overrightarrow{mq}$ are FIG. 12. Geometry for SAR in the forward looking mode showing the $j^{th}$ range cell at the center of the observation interval.

$$\overrightarrow{mq} = \{r^*, \alpha^*, \beta^*\} \quad (A.2)$$

where r* is the slant range to the center of the footprint at central time. The velocity vector $\overrightarrow{v}$ is given below in both absolute and spherical coordinates $$\overrightarrow{v} = \{v_x, v_y, v_B\} = \{v, \alpha_m, \beta_m\}. \quad (A.3)$$

All the relevant footprint information is easily computed using equations (A.1), (A.2), and (A.3), together with the bandwidth B, the observation interval $D_{ob}$, and the antenna beamwidth $\theta$. In particular, the centers of all the range cells $\{q_j$ for $j=1, N_r\}$ are defined in terms of their spherical coordinates $$\overrightarrow{mq_j} = \{r^*_j, \alpha^*_j = \alpha^*, \beta^*_j\}. \quad (A.4)$$

Since the center of the footprint q corresponds to $j=N_r/2$, it follows that $$r^*_j = r^* + (j - N_r/2)\Delta R \text{ and} \quad (A.5a)$$

$$\beta^*_j = \cos^{-1}(h/r^*_j) \quad (A.5b)$$

where $\Delta R$ is the width of a range bin.

3. Coefficients for the Simplified Taylor Series

The round trip delay at relative time transmit time t to an arbitrary scatterer in the $j^{th}$ range cell, $C(j,\mu,\epsilon)$, can be expressed as a simplified Taylor expansion about the $j^{th}$ reference scatterer at central time $$\tau(t,\mu,\epsilon) = \overline{\tau}^*_j + t\{\overline{\tau}_1(j) + \overline{\tau}_{12}(j)\mu\} + \overline{\tau}_{122}(j)(\mu^2/2) + (t^2/2)\overline{\tau}_{11}(j). \quad (A.6)$$

Only $\overline{\tau}_1(j)$, $\overline{\tau}_{11}(j)$, $\overline{\tau}_{12}(j)$, $\overline{\tau}_{122}(j)$, need to be computed because the constant phase due to $\overline{\tau}^*_j$ does not affect doppler.

It is more practical to compute the coefficients in steps, using the chain rule for partial derivatives, rather than to give complicated formulas. This approach corresponds exactly to the computer implementation:

$$\overline{f} = \tan \beta_j$$

$$\overline{g} = \cos(\alpha^* - \alpha_v)\sin \beta_v$$

$$\overline{y} = h^2 + h^2 \overline{f}^2$$

$$\overline{r}_y = 0.5/\overline{r}$$

$$\overline{r}_{yy} = -0.25/\overline{r}^3$$

$$\overline{g}_\mu = -\sin(\alpha^* - \alpha_v)\sin \beta_v$$

$$\overline{g}_{\mu\mu} = -\cos(\alpha^* - \alpha_v)\sin \beta_v$$

$$\overline{y}_t = -\overline{f}\overline{g} + 2hv_=$$

$$\overline{y}_{tt} = 2v^2$$

$$\overline{y}_{t\mu} = -\overline{f}\overline{g}_\mu$$

$$\overline{y}_{t\mu\mu} = -\overline{f}\overline{g}_{\mu\mu}$$

$$\overline{r}_1 = \overline{r}_y \overline{y}_t$$

$$\overline{r}_{11} = \overline{r}_y \overline{y}_{tt} + \overline{r}_{yy} \overline{y}_t^2$$

$$\overline{r}_{12} = \overline{r}_y \overline{y}_{t\mu}$$

$$\overline{r}_{122} = \overline{r}_y \overline{y}_{t\mu\mu}$$

$$\overline{\tau}_1(j) = (2/c)\overline{r}_1$$

$$\overline{\tau}_{11}(j) = (2/c)\overline{r}_{11}$$

$$\overline{\tau}_{12}(j) = (2/c)\overline{r}_{12}$$

$$\overline{\tau}_{122}(j) = (2/c)\overline{r}_{122}$$

where c is the speed of light.

4. Coefficients for the General Taylor Series.

Other incremental variables in the Taylor expansion can be easily included. For example one may want to account for incremental variations of the vector velocity during the observation interval.

We claim:

1. A radiant energy detection system wherein electromagnetic energy is transmitted toward an object, the system having detection means for detecting presence of a received target signal, signal processing means for processing received signals, a computer for providing command, timing, and synchronizing control signals for the detection system operation, a synthetic signal synthesizer coupled between said detection means and said computer for receiving command and timing control signals from said computer and for providing in-phase and quadrature (I and Q) output signals to said detection means, said detection means providing I and Q outputs to said signal processing means; and wherein said synthetic signal synthesizer comprises an impulse generator having an input coupled to receive said timing signals from said computer and having an output; first and second modulators each having respective first and second inputs, said first inputs being coupled to said computer for receiving I and Q sequences from the computer and said second inputs being coupled to receive said output of said impulse generator, said timing signals being indicative of real time occurrence of return signals from target scatterers and prompting the impulse generator to provide the output pulses to the second inputs of said modulators, said modulators modulating the received output pulses with the respective I or Q sequence received from the computer to provide a modulated output that is precisely coordinated with the return signal from the scatterers present in the I and Q sequence signals; each modulator having an output pulse train; and first and second low pass filters having respective inputs coupled to respective first and second modulator outputs for receiving respective outputs therefrom; said first and second filters having an impulse response which matches the impulse response of the system and providing I and Q outputs respectively.

2. A radiant energy detection system as set forth in claim 1 and further comprising a coherent oscillator for providing a synchronization signal output; and an array of mixers and adders coupled to provide said signal synthesizer I and Q output signals to said detection means, said mixers having first inputs selectively coupled to said modulator outputs and having respective second inputs coupled to receive an input from said coherent oscillator for providing respective in-phase and quadrature output signals from each modulator output signal, said mixers having outputs selectively coupled to said adders, said adders having inputs coupled to said mixer outputs and providing the synthesizer I and Q output signals as modulated quadrature IF signals to the detection means.

3. A radiant energy detection system as set forth in claim 2 and further comprising invariant mapping processing means coupled between said signal processing means and said computer for mapping inputs from the signal processing means onto an absolute x—y reflectivity map prior to coupling out the information to said computer, and a rotation matrix coupled between said detection means and said signal processing means for providing range relative deramping of I and Q input signals thereto prior to coupling said signals to the signal processing means.

4. A radiant energy detection system as set forth in claim 2 and further comprising a motion compensator having an output coupled to the computer for providing spatial position output information to the computer, said spatial position output information being referenced to each transmitted pulse or signal, and wherein said computer monitors time with reference to each transmission pulse time and calculates the Taylor coefficients needed for generation of the I and Q signal sequences which are coupled to the respective modulators of the synthetic signal synthesizer to modulate the output pulses from the impulse generator to provide two pulse trains to obtain the correct I and Q synthetic signal output from the synthesizer.

5. A radiant energy detection system as set forth in claim 4 and further comprising display means coupled to said computer for displaying information received by the system.

6. A radiant energy detection system as set forth in claim 5 wherein said synthetic signal synthesizer further comprises a 270° and a 180° phase shifter, each having an input and an output, said 270° phase shifter having the input coupled to the output of said coherent oscillator and having the output coupled to the input of said 180° phase shifter; said array of mixers and adders comprise first, second, third, and fourth mixers and first and second adders, said first and fourth mixers having the first inputs thereof coupled to the output of said first modulator, and said fourth mixer having the second input coupled to the output of said 270° phase shifter for receiving the phase shifted output from the coherent oscillator, said second and third mixers having the first inputs thereof coupled to the output of said second modulator, and said second input of the second mixer being coupled to the output of said 180° phase shifter, said first adder having first and second inputs coupled respectively to the outputs from said first and second mixers to receive the outputs therefrom and provide I output signals to said detection means, and said second adder having first and second inputs coupled respectively to the outputs from said third and forth mixers to receive the outputs therefrom and provide Q output signals to said detection means.

7. A radiant energy detection system wherein electromagnetic energy is transmitted toward and reflected energy is received from an object, the system having synchronous detection means for detecting presence of a received target signal; signal processing means for processing received signals, a computer for providing command, timing, and synchronizing control of the detection system operation; a synthetic signal synthesizer coupled between said synchronous detection means and said computer for receiving command and timing control signals from said computer and for providing in-phase and quadrature (I and Q) output signals to said detection means, said detection means providing I and Q outputs to said signal processing means; invariant mapping processing means coupled between said signal processing means and said computer for mapping inputs from the signal processing means onto an absolute x—y reflectivity map prior to coupling out the information to said computer; display means coupled to said computer for displaying information received by the system; and a coherent oscillator for providing a synchronization signal output; and wherein said synthetic signal synthesizer comprises first and second modulators having respective first inputs coupled to said computer and each having a second input and an output, an impulse generator having an input coupled to said computer and having an output coupled to the second inputs of said modulators, and an array of mixers and adders coupled to provide said I and Q output signals from said synthetic signal synthesizer to said synchronous detection means, said mixers having first inputs selectively coupled to said modulator outputs and having respective second inputs coupled to receive an input from said coherent oscillator for providing respective in-phase and quadrature output signals from each modulator output signal, said mixers having outputs selectively coupled to said adders, said adders having inputs coupled to said mixer outputs and providing the I and Q output signals as modulated quadrature IF signals to the synchronous detection means.

8. A radiant energy detection system as set forth in claim 7 wherein said synthetic signal synthesizer further comprises a 270° and a 180° phase shifter, each having an input and an output, said 270° phase shifter having the input coupled to the output of said coherent oscillator and having the output coupled to the input of said 180° phase shifter; said array of mixers and adders comprise first, second, third, and fourth mixers and first and second adders, said first and fourth mixers having the first inputs thereof coupled to the output of said first modulator, and said fourth mixer having the second input coupled to the output of said 270° phase shifter for receiving the phase shifted output from the coherent oscillator, said second and third mixers having the first inputs thereof coupled to the output of said second modulator, and said second input of the second mixer being coupled to the output of said 180° phase shifter, said first adder having first and second inputs coupled respectively to the outputs from said first and second mixers to receive the outputs therefrom and provide I output signals to said synchronous detection means, and said second adder having first and second inputs coupled respectively to the outputs from said third and fourth mixers to receive the outputs therefrom and provide Q output signals to said synchronous detection means.

9. A radiant energy detection system as set forth in claim 8 wherein said system is an aperture radar system and said electromagnetic energy is in the form of a modulated carrier signal transmitted toward an object and reflected energy is received from the object, and further comprising a rotation matrix coupled between said synchronous detection means and said signal processing means for providing range relative deramping of I and Q input signals thereto prior to coupling said signals to the signal processing means.

10. In an aperture radar system wherein electromagnetic energy in the form of a modulated carrier signal is transmitted toward an object and reflected energy is received from the object, the system having a synchronous detection circuit for synchronous detection of a target signal, digital signal processing means for processing received signals and computer means for providing command and timing control signal outputs and synchronizing control of the radar system operation, the improvement comprising: synthetic signal synthesizing means coupled between said synchronous detection circuit and said computer means for receiving said command and timing control signals from said computer means and for providing in-phase and quadrature (I and Q) output signals to said synchronous detection circuit to provide enhanced cross-range resolution in linear geometries and optimum resolution in nonlinear geometries; and invariant mapping processing means coupled between said signal processing means and said computer for mapping inputs from the signal processing means onto an absolute x—y reflectivity map prior to coupling out the information to said computer; a coherent oscillator for providing a synchronization signal output; and wherein said synthetic signal synthesizing means comprises an impulse generator having an input coupled to receive said timing signals from said computer and having an output; first and second modulators having respective first inputs coupled to said computer and each having an output; and an array of mixers and adders coupled to provide said I and Q output signals from said signal synthesizing means to said synchronous detection circuit; said mixers having first inputs selectively coupled to said modulator outputs and having respective second inputs coupled to receive an input from said coherent oscillator for providing respective in-phase and quadrature output signals from each modulator output signal, said mixers having outputs selectively coupled to said adders, said adders having inputs coupled to said mixer outputs for providing the synthetic signal synthesizer I and Q output signals as modulated quadratic IF signals to the synchronous detection circuit; and said modulators each having respective second inputs coupled to receive the output of said impulse generator, said timing signals prompting the impulse generator to provide output pulses indicative of real time occurrence of target scatterer return signals to said second inputs of said modulators, and said modulators modulating the received output pulses with the respective I and Q sequences received from the computer, thereby providing a modulated output that is precisely synchronized to occur with the return signal from scatterers present in the I and Q sequences.

11. In an aperture radar system as set forth in claim 10 wherein electromagnetic energy in the form of a modulated carrier signal is transmitted toward an object and reflected energy is received from the object, the synthetic signal synthesizing means further comprising first and second low pass filters having respective inputs thereof selectively coupled to respective first and second modulator outputs for receiving outputs therefrom; said first and second filters having an impulse response which matches the impulse response of the system and said first and second filters providing I and Q outputs respectively as said selectively coupled first inputs of said mixers.

12. In an aperture radar system as set forth in claim 11, the system further comprising a motion compensator having an output coupled to the computer means for providing spatial position output information to the computer, said spatial position output information being referenced to each transmitted pulse or signal, and wherein said computer monitors time with reference to each transmission pulse time and calculates the Taylor coefficients needed for generation of the I and Q signal sequences which are coupled to the respective modulators of the synthetic signal synthesizer to modulate the output pulses from the impulse generator to provide two pulse trains to obtain the correct I and Q synthetic signal output from the synthesizer.

\* \* \* \* \*